Aug. 12, 1924.  1,504,388
F. L. SHELOR
LABELING MACHINE
Filed Aug. 4, 1920   14 Sheets-Sheet 7

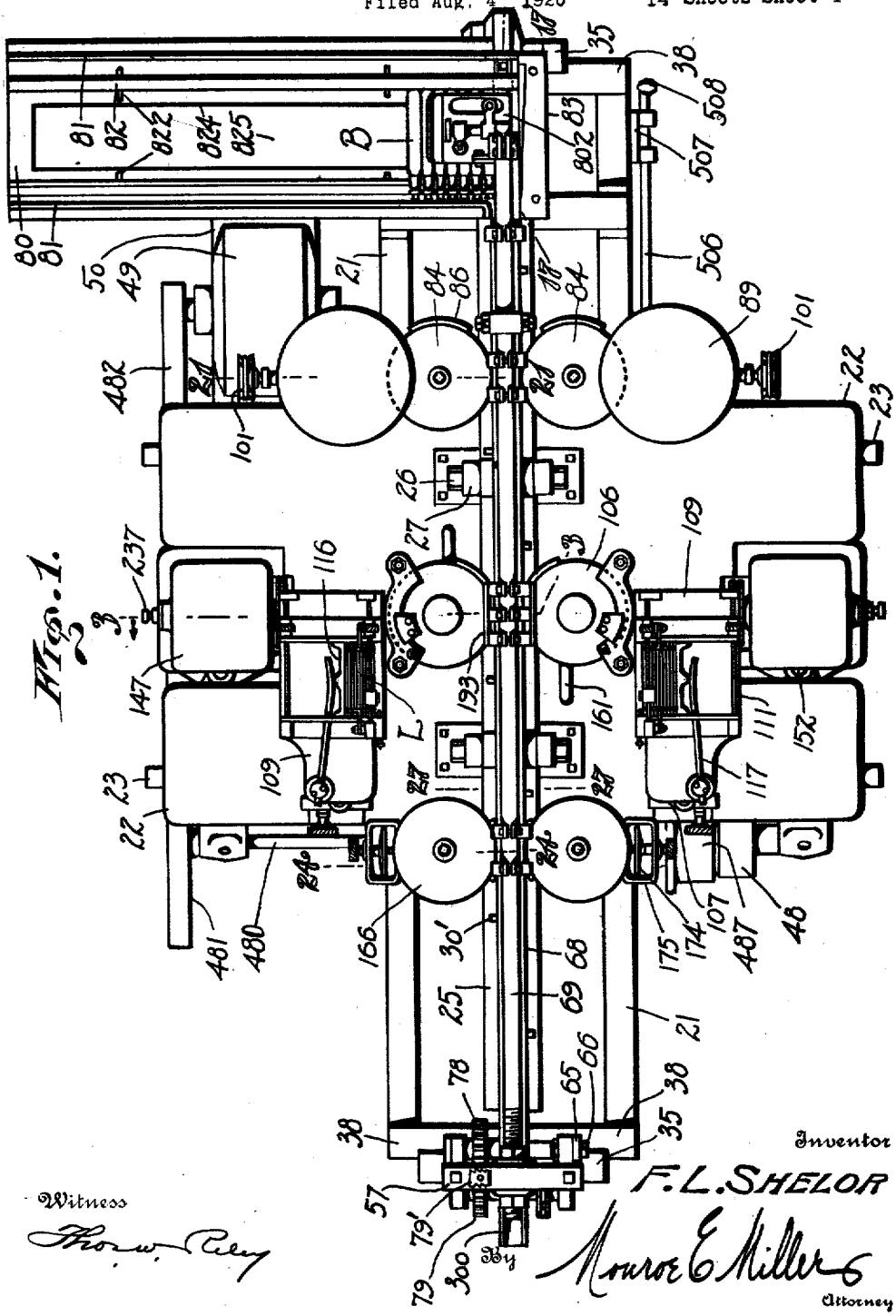

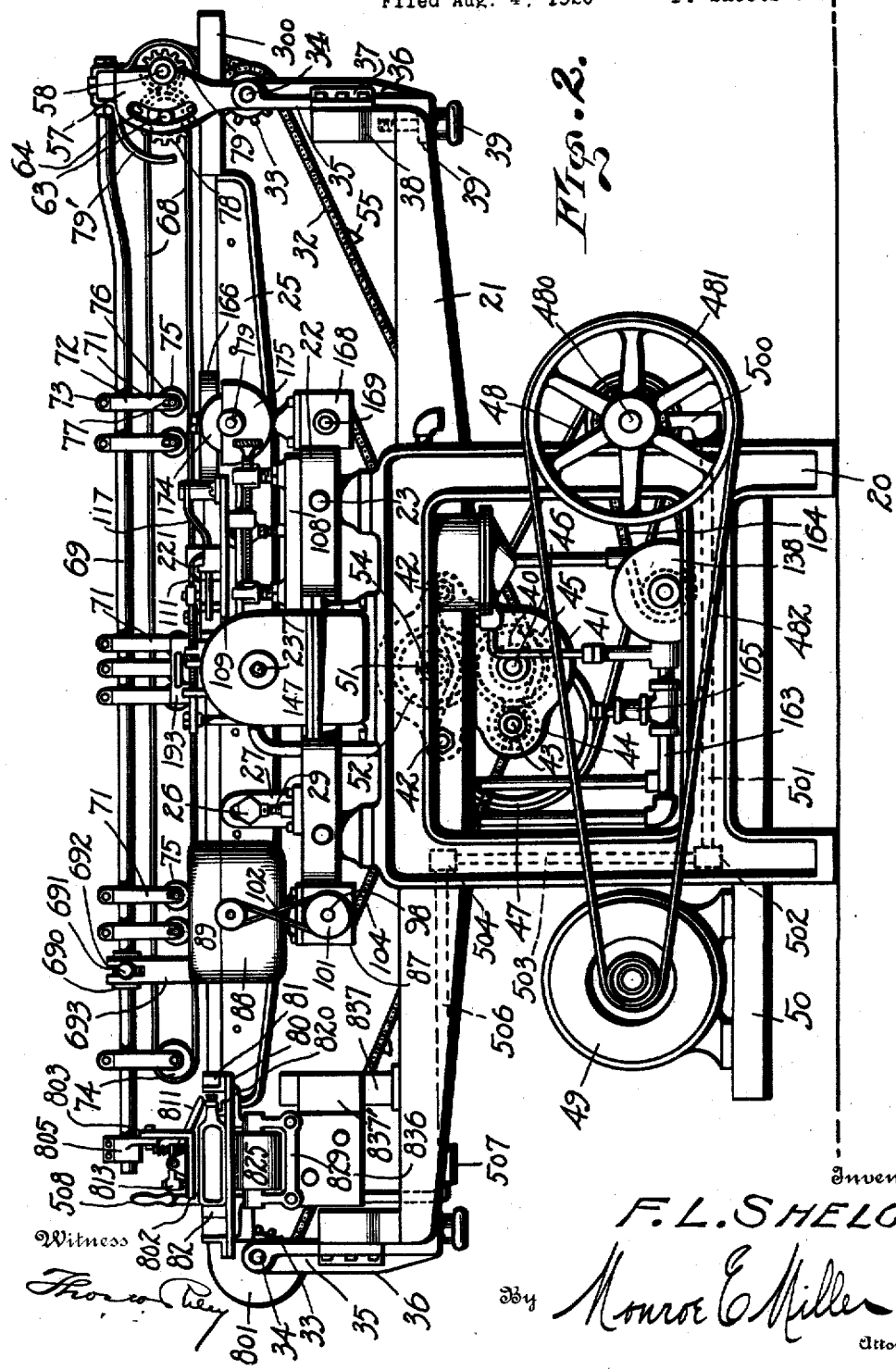

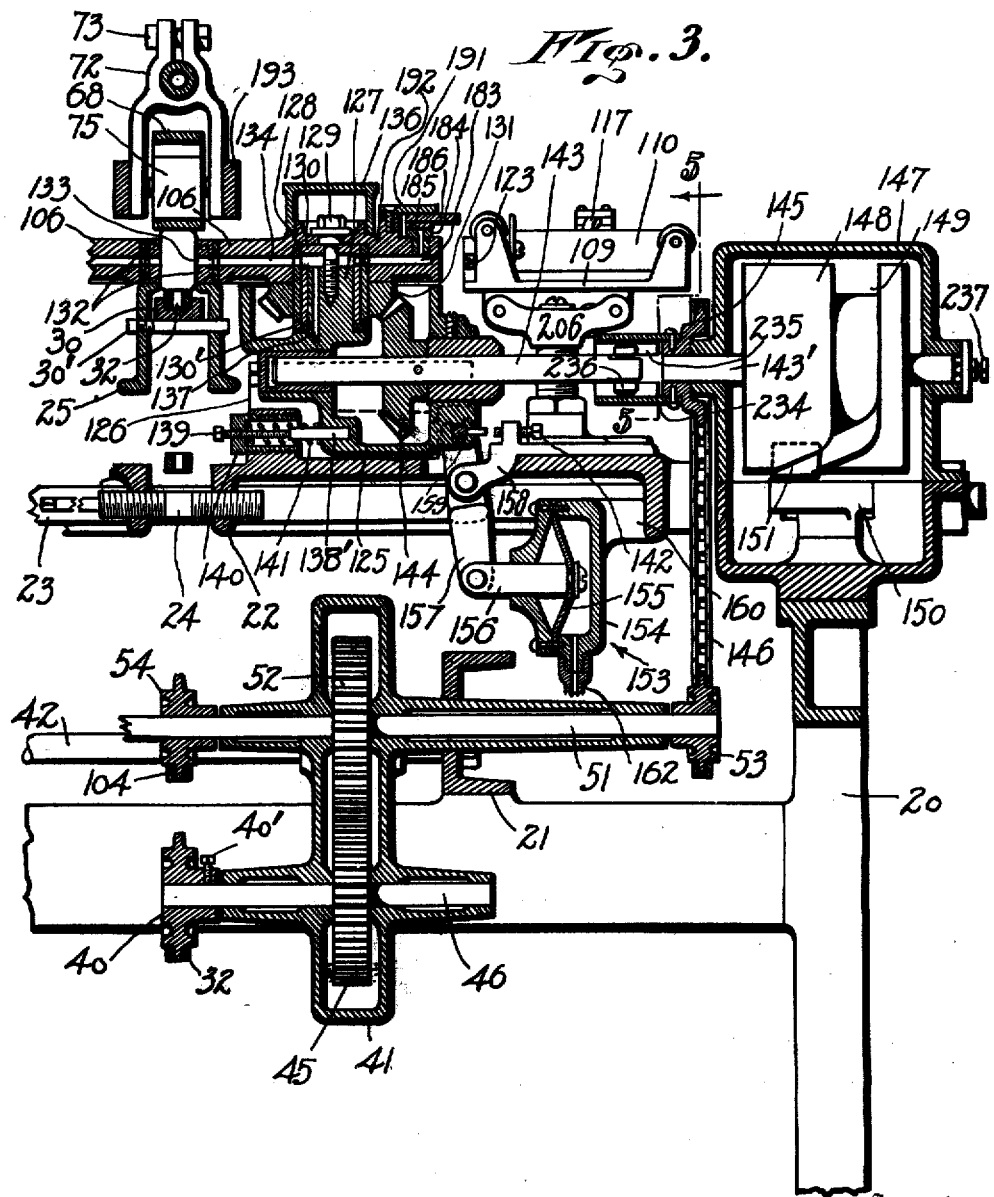

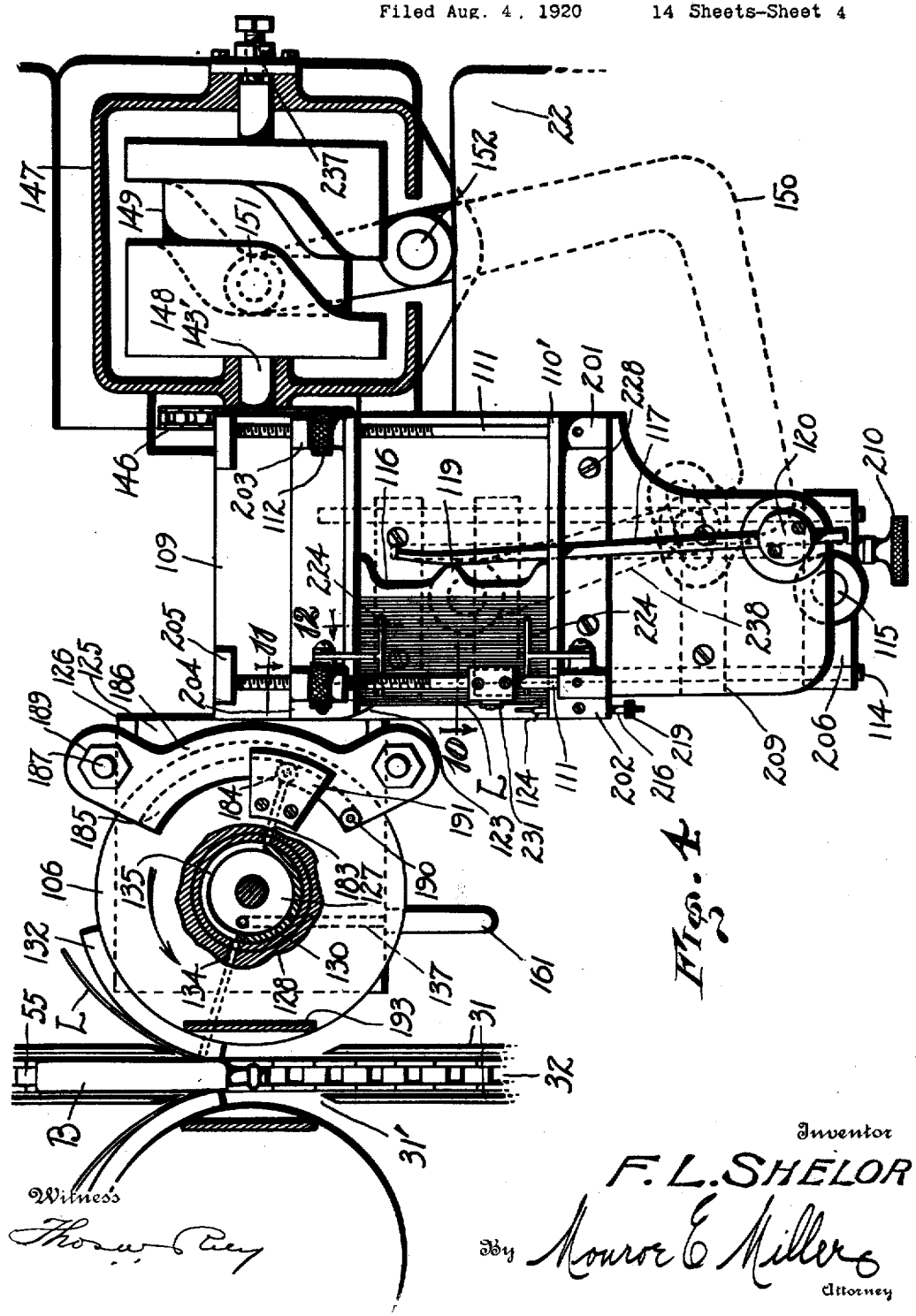

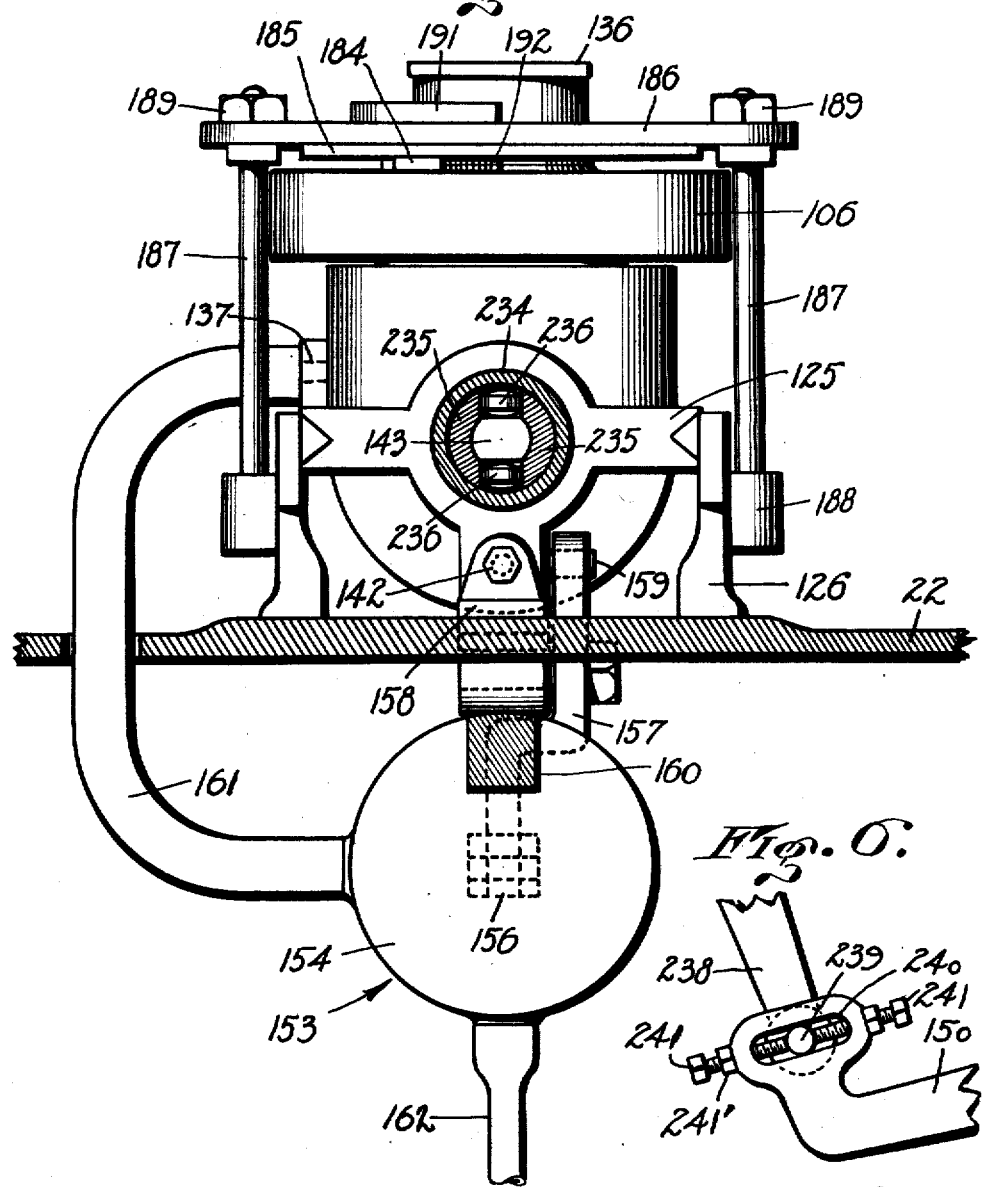

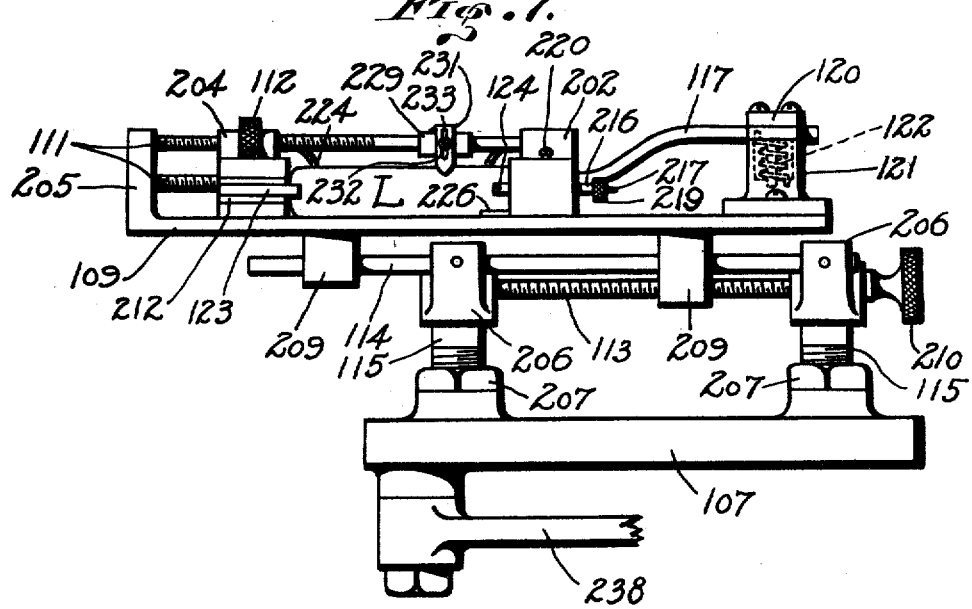
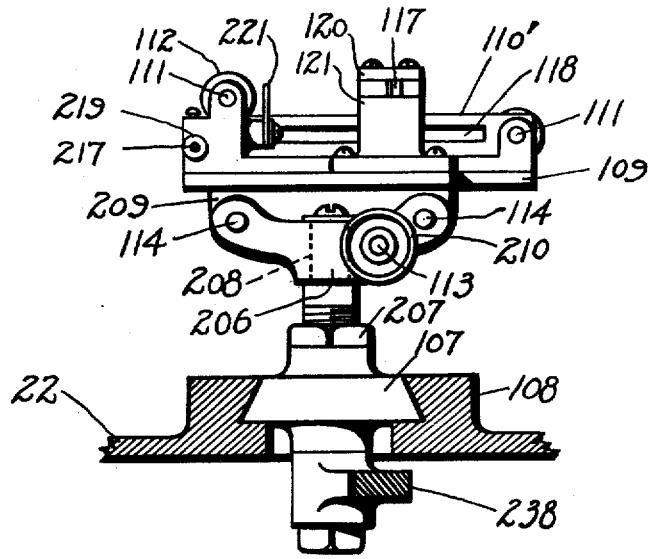

Witness
Thos. W. Pury

Inventor
F. L. SHELOR
By Monroe E. Miller
Attorney

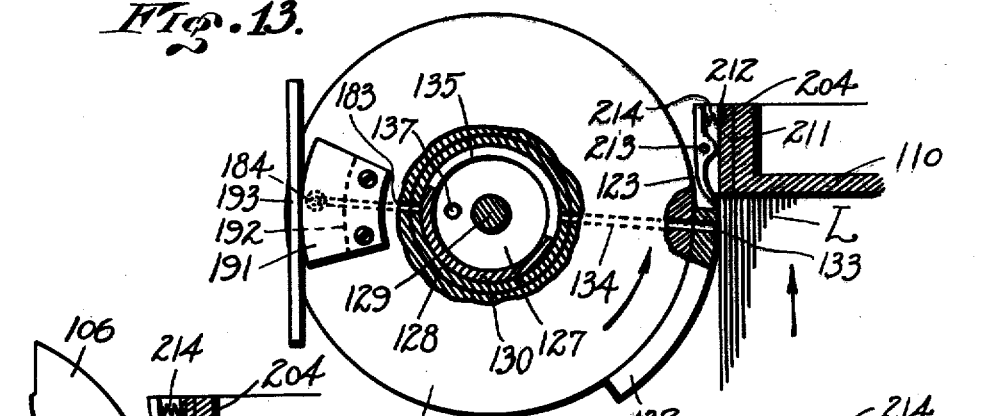
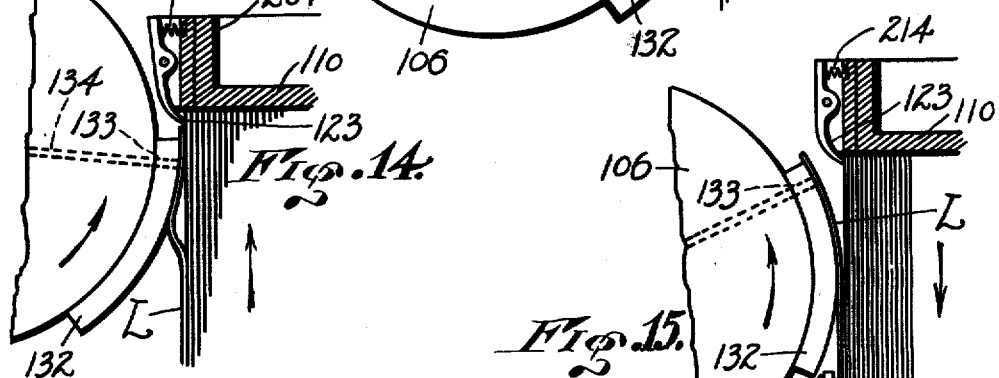
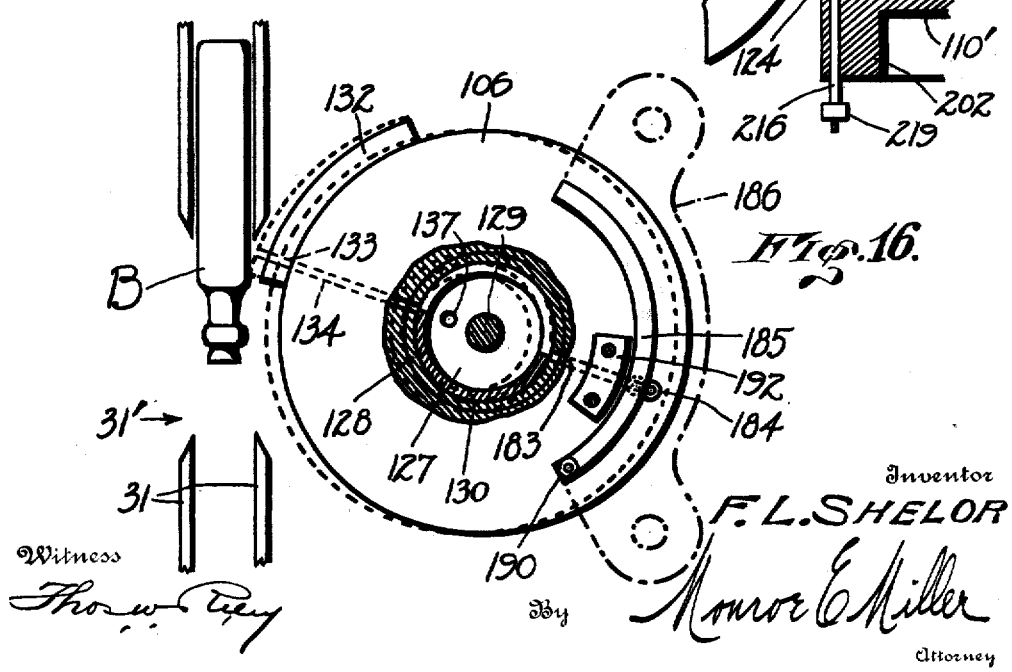

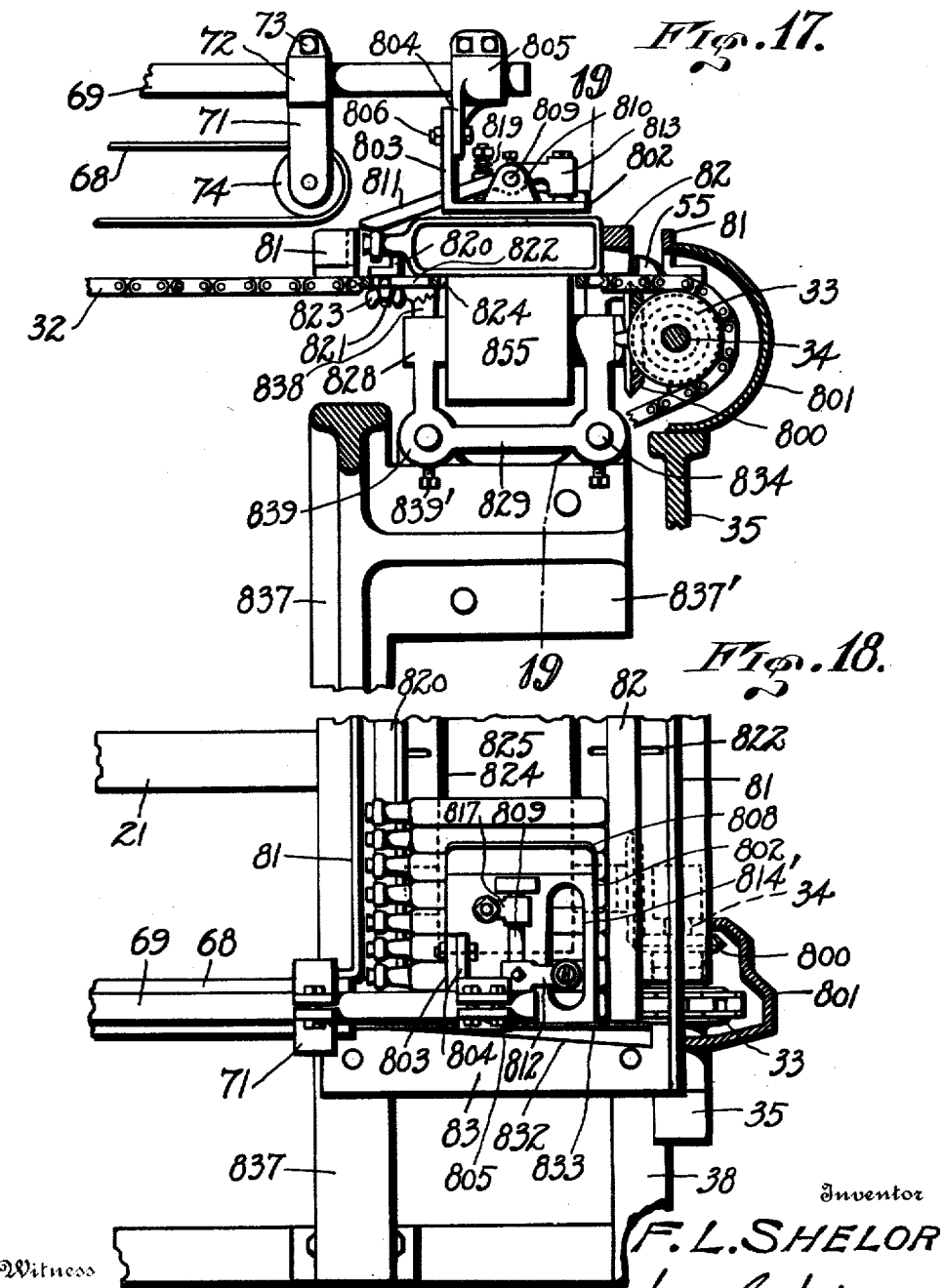

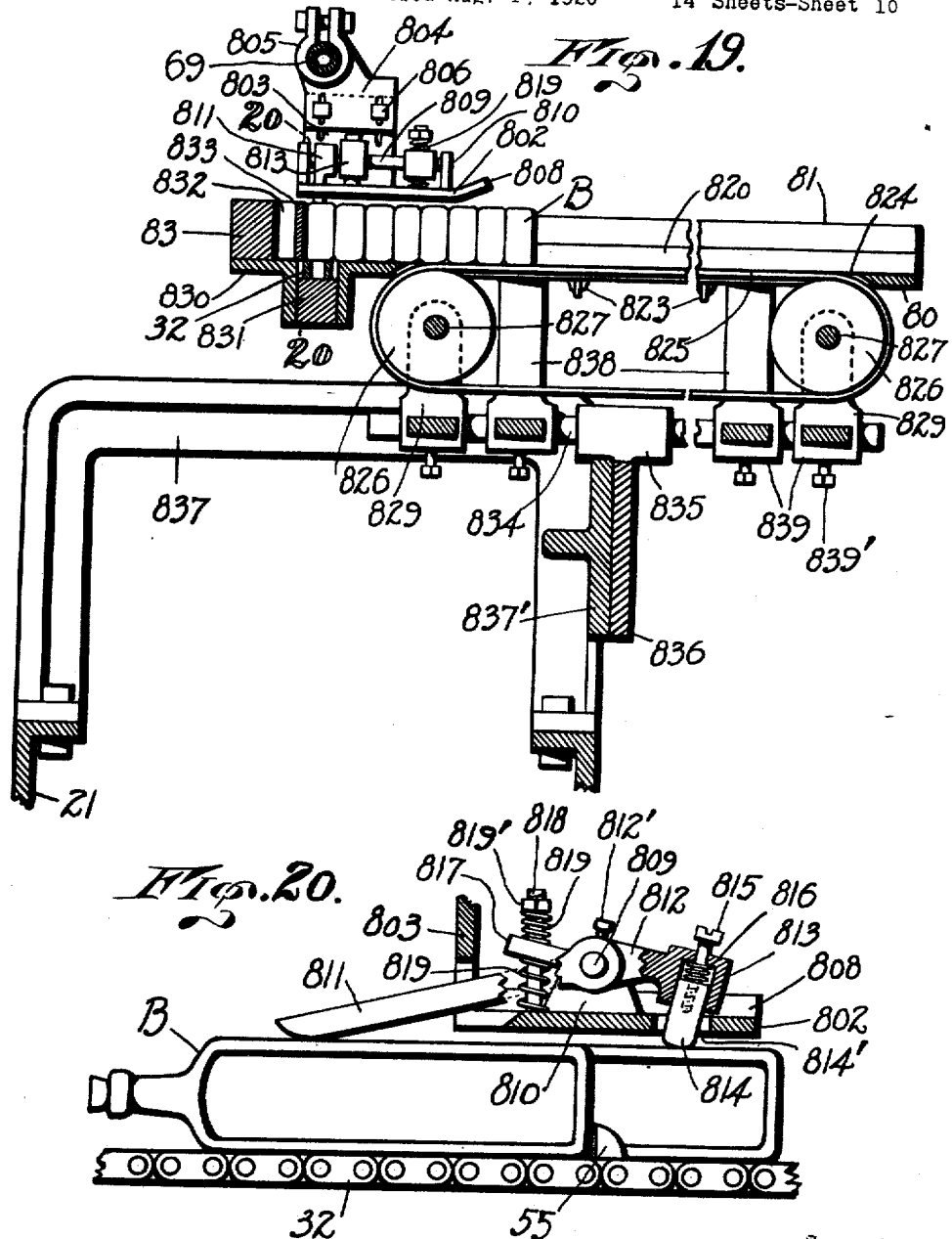

Aug. 12, 1924.
F. L. SHELOR
LABELING MACHINE
Filed Aug. 4, 1920
1,504,388
14 Sheets-Sheet 11
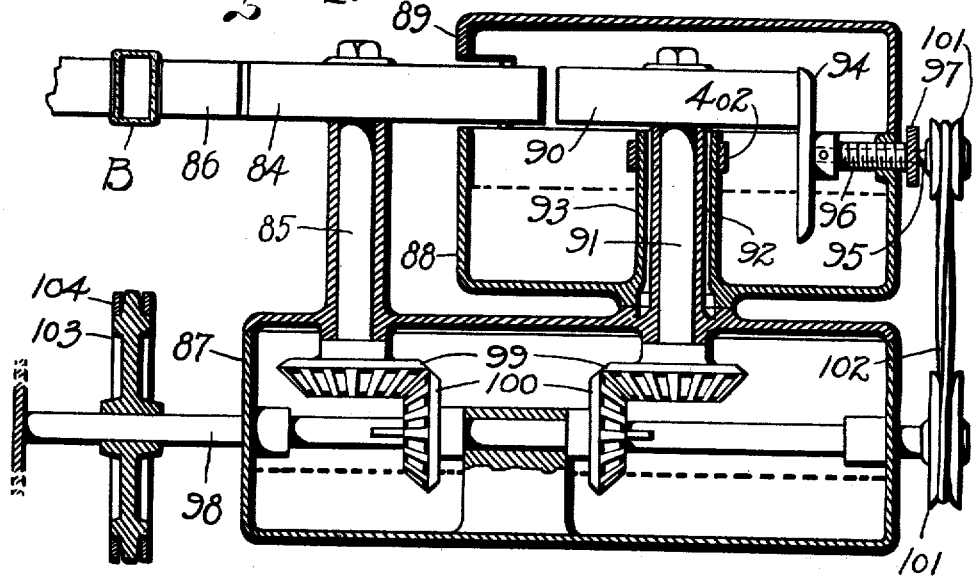
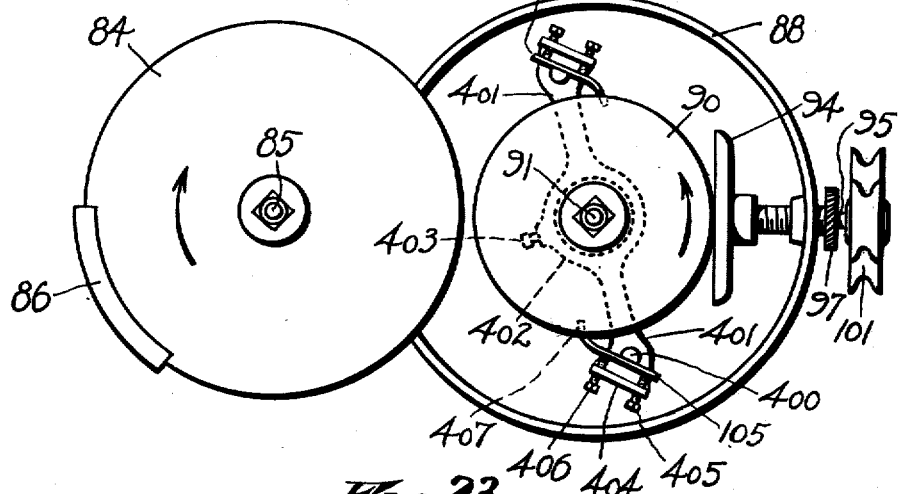
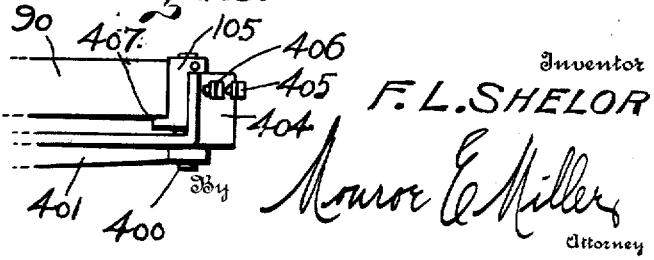
Inventor
F. L. SHELOR

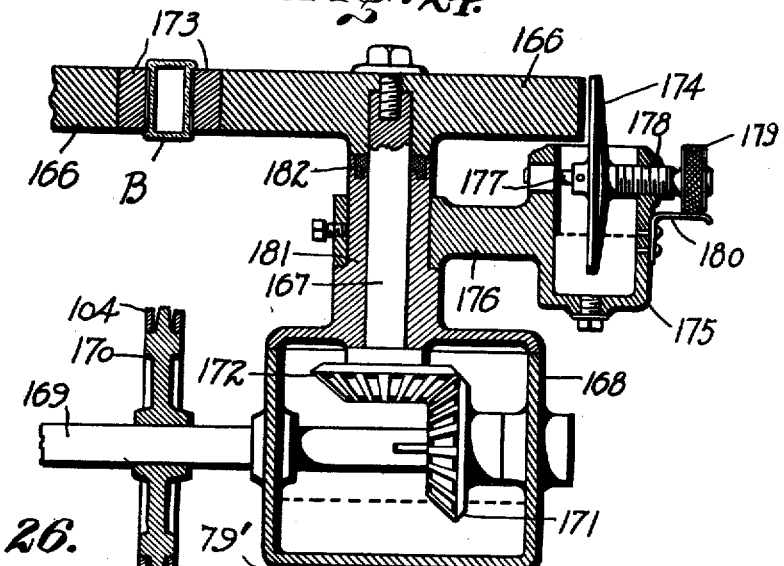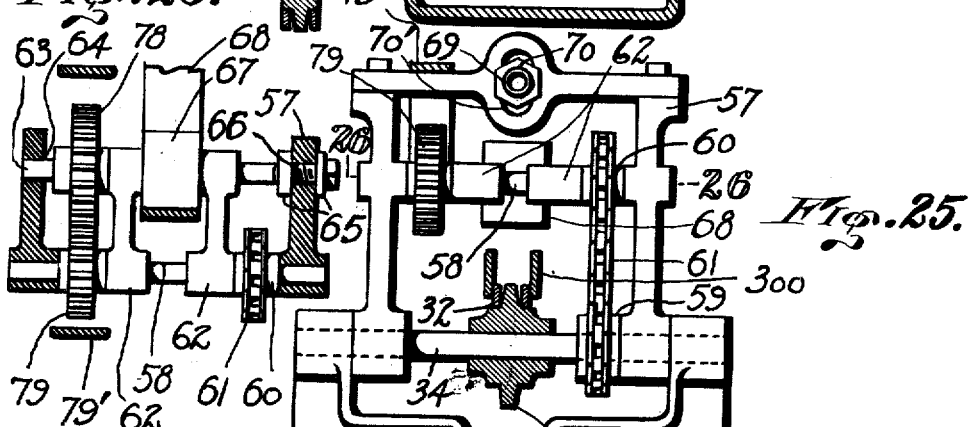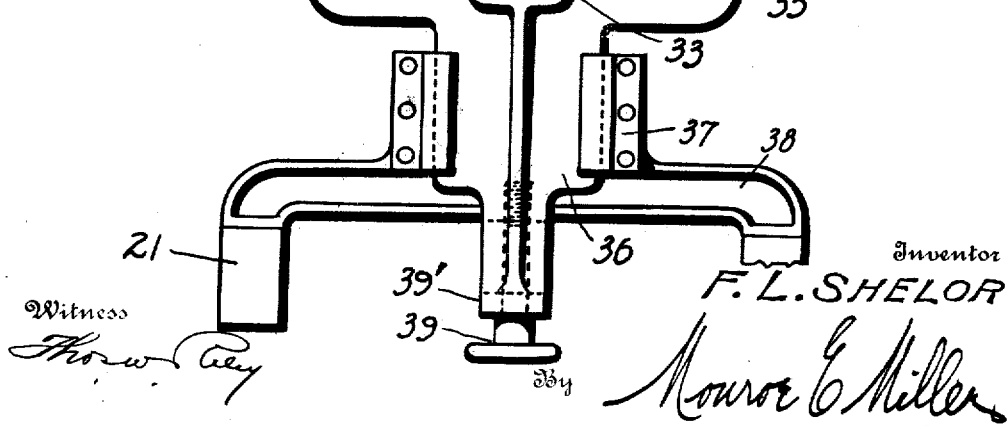

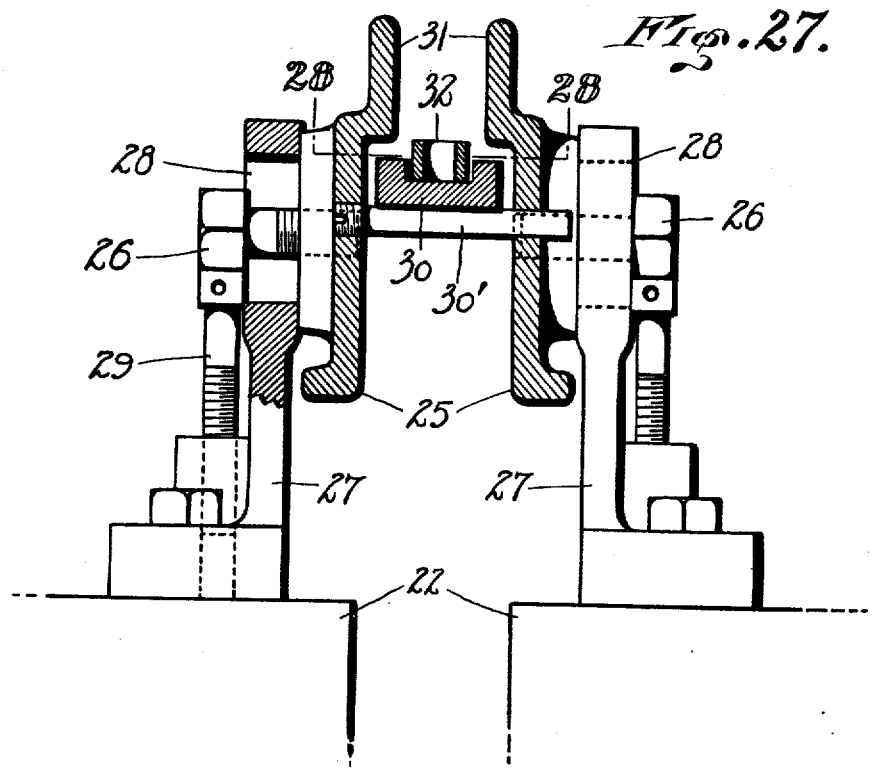
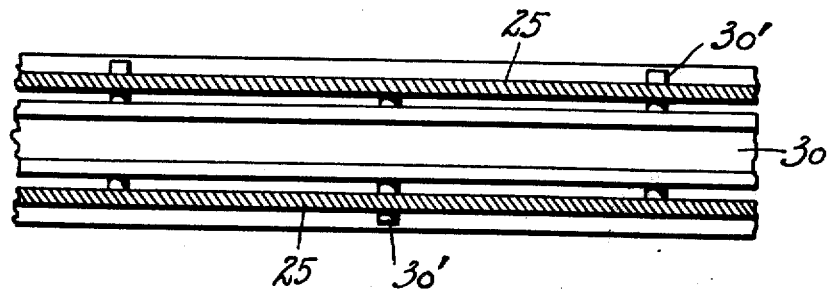

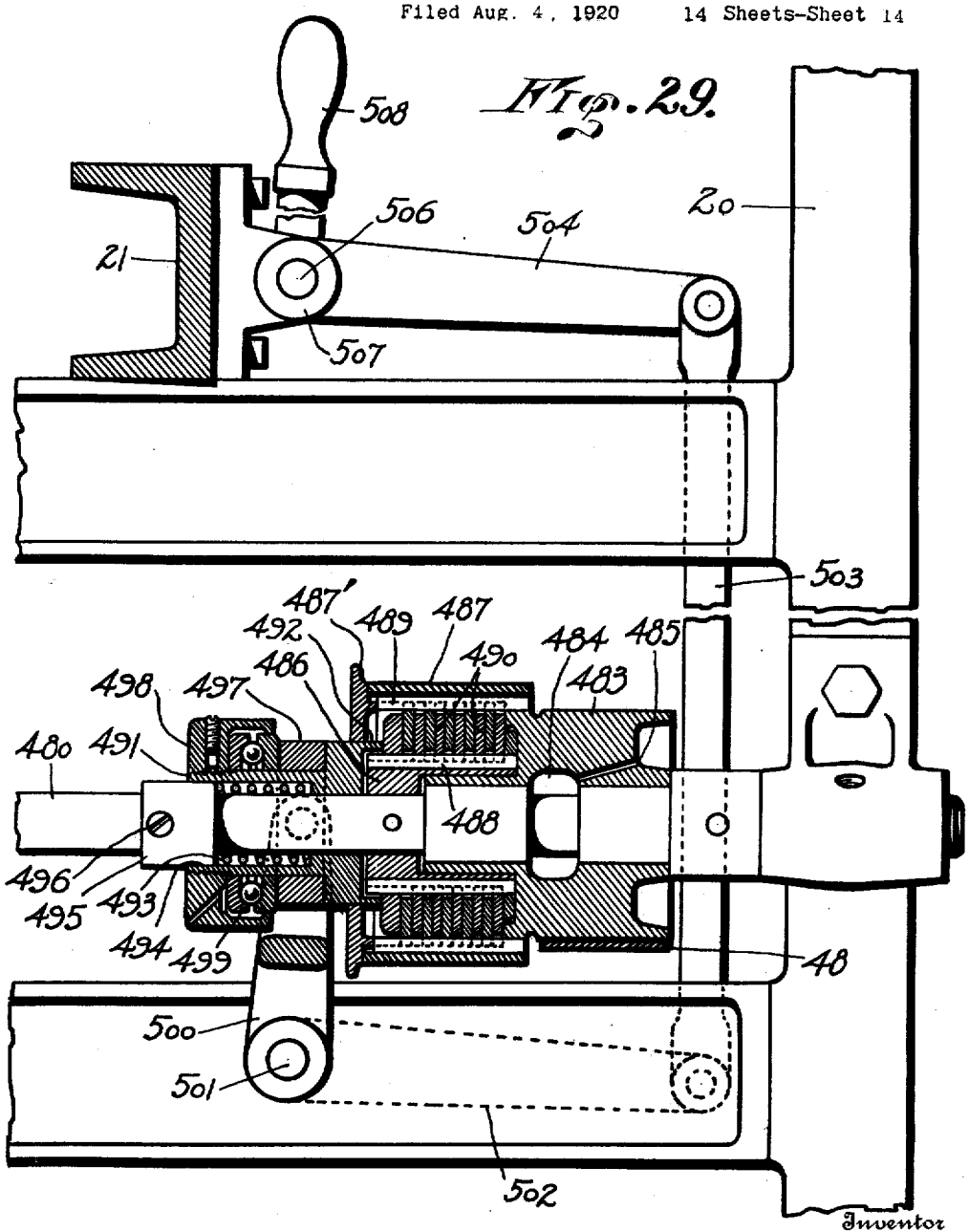

Patented Aug. 12, 1924.

1,504,388

UNITED STATES PATENT OFFICE.

FREDERICK L. SHELOR, OF PETERSBURG, VIRGINIA, ASSIGNOR TO INTERNATIONAL FILLER CORPORATION, OF PETERSBURG, VIRGINIA, A CORPORATION OF VIRGINIA.

LABELING MACHINE.

Application filed August 4, 1920. Serial No. 401,104.

*To all whom it may concern:*

Be it known that I, FREDERICK L. SHELOR, a citizen of the United States, residing at Petersburg, in the county of Dinwiddie and State of Virginia, have invented certain new and useful Improvements in Labeling Machines, of which the following is a specification, reference being had therein to the accompanying drawing.

The present invention relates to machines for applying labels to bottles and other objects, and appertains more especially to improvements and refinements of the bottle labeling machine disclosed in my Patent No. 1,413,795, granted April 25, 1922.

It is the object of the invention to improve such machine in several particulars, in order to enhance the utility and operation thereof, and to provide for beneficial advantages.

One of the specific objects of the invention is the provision of a novel and improved magazine for bottles or objects from which they are supplied one at a time in succession for the application of labels thereto, and a further object in this connection, is to provide novel means for controlling the movement of the bottles or objects in the magazine, whereby to prevent breakage and to facilitate the proper transfer of the objects from the magazine to the conveying means.

Another object is the improvement of the paste applying means in order to regulate the amount of paste supplied and to avoid excess paste.

A further object is the provision of ironing means for ironing or flattening out the labels on the objects, and operating to supply moisture to the outer surfaces of the labels opposite to the surfaces contacting with the paste, whereby the labels will lie flat against the objects, and such moisture supplying means also serving to dilute or wash away any paste that is transferred to the ironing members, to prevent such ironing members being gummed up when labels are refused. This feature is of considerable advantage, inasmuch as the labels when moistened by paste on the inner surfaces thereof, have a tendency to curl, either lengthwise or crosswise, depending upon the direction of the grain of the paper, thereby causing, in some instances, the edges of the labels springing or curling away from the bottles or objects, even though they were pressed or ironed out against the objects, but, by the provision of the present improvements for supplying moisture to the outer surfaces of the labels, both surfaces thereof are moistened, so that the labels will lie flat, thereby overcoming the curling or blistering thereof away from the objects and eliminating a serious objection to the proper adherence of the labels to the objects.

A further object is the improvement of the label magazine and label picker and applier, whereby they cooperate to assure of the proper picking of the labels one at a time from the magazine, and the label magazine and label picker and applier have several improvements in connection therewith to provide for efficient operation, adjustments and advantages, as will appear more fully from the description.

Another object is to mount the label wheel for shifting movement and to control same in a novel manner, whereby to prevent the label pad from touching the paste on the bottles or objects when a label is refused by said wheel, leaving the pad exposed, and which would cause said pad to be gummed up with paste if it were permitted to contact with the bottle or object as when applying a label.

The machine also embodies improvements in various other devices and details thereof, including the actuating mechanism, conveying means, adjustments, etc., as will hereinafter more fully appear, as the description proceeds, it being understood that changes and alterations can be made, within the scope of what is claimed, to suit various conditions and circumstances, without departing from the spirit of the invention.

The invention is illustrated in the accompanying drawings, wherein:—

Figure 1 is a plan view of the machine.

Fig. 2 is a side elevation thereof.

Fig. 3 is an enlarged vertical transverse section taken on the line 3—3 of Fig. 1.

Fig. 4 is an enlarged plan view of one label magazine, picker and applying wheel, and accompanying parts, portions being shown in section.

Fig. 5 is an enlarged section on the line

5—5 of Fig. 3 showing the label wheel and its slide.

Fig. 6 is a detail view of an adjustable joint in the label magazine actuating means.

Fig. 7 is an inside elevation of the label magazine and its slide.

Fig. 8 is an end view of said magazine and slide.

Figure 9:
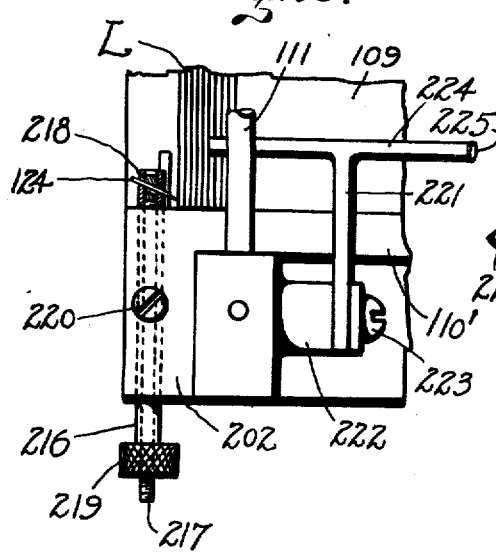

Fig. 9 is an enlarged fragmentary plan view of the label magazine showing the label detaining and separating pin and one of the label depressors or guides.

Figure 10:
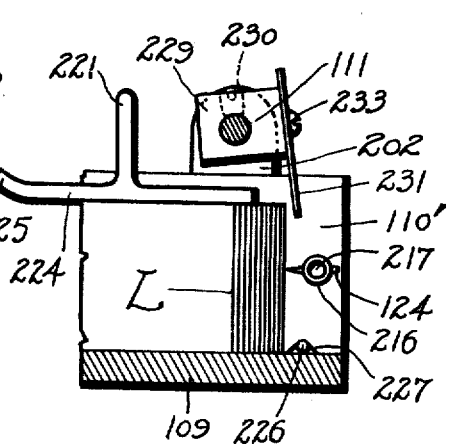
Figure 11:
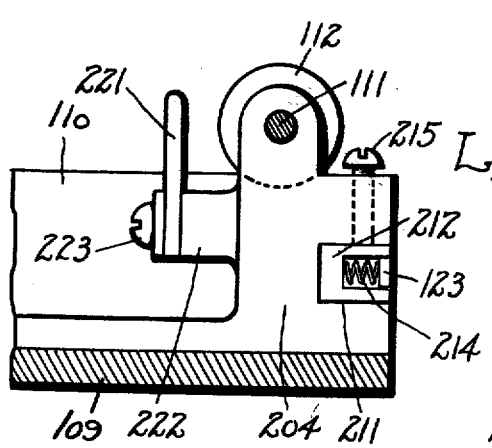
Figure 12:
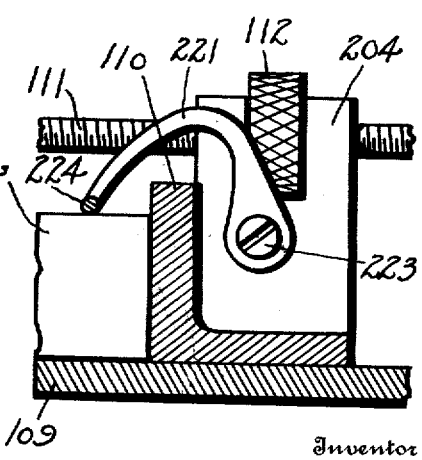

Figs. 10, 11 and 12 are enlarged sectional details of the label magazine taken on the lines 10, 11 and 12 of Fig. 4, respectively.

Fig. 13 is a fragmentary plan view of the label wheel and magazine showing the label pad of said wheel in starting position to pick a label from the magazine, portions being shown in section.

Fig. 14 is a similar view, portions of the wheel being broken away, showing the next step during which the forward end of the label is loosened or withdrawn to leave the magazine.

Fig. 15 is a similar view showing the third and final step in stripping the label from the magazine.

Fig. 16 is a plan view of the label wheel, portions being shown in section, showing the wheel in label applying position in dotted lines and in non-applying position in full lines.

Fig. 17 is an enlarged section on the line 17—17 of Fig. 1 showing the bottle magazine.

Fig. 18 is an enlarged fragmentary plan view of the bottle magazine showing the delivery end thereof.

Fig. 19 is a longitudinal section of the bottle magazine taken on the line 19—19 of Fig. 17.

Fig. 20 is a sectional detail taken approximately on the line 20—20 of Fig. 19.

Fig. 21 is an enlarged section on the line 21—21 of Fig. 1, showing a paste applying device.

Fig. 22 is a plan view of such device with the top or cover of the paste pot removed.

Fig. 23 is a detail elevation showing one of the paste scrapers.

Fig. 24 is an enlarged section on the line 24—24 of Fig. 1 showing a label ironing means and moisture supplying means therefor.

Fig. 25 is a view looking toward forward ends of the conveying and retarding means showing the mounting thereof at such end.

Fig. 26 is a section on the line 26—26 of Fig. 25.

Fig. 27 is an enlarged cross section of the bottle guide or track taken on the line 27—27 of Fig. 1.

Fig. 28 is a horizontal section of the track taken on the line 28—28 of Fig. 27.

Fig. 29 is an enlarged fragmental view showing the clutch in section and its operating means.

The machine, in general respects, is quite similar to the machine disclosed in said patent, and embodies a suitable frame 20 having the parallel beams 21 extending longitudinally, and also having a pair of tables or supporting members 22 at the opposite sides of the longitudinal median plane and slidable laterally on the rods 23 mounted transversely on the frame. An adjusting screw 24 connects the tables 22, having right and left hand threads for moving said tables toward and away from one another, to obtain the desired adjustment.

The operating mechanism mounted on the frame comprises, generally considered, a bottle conveyor, bottle magazines, paste applying devices, label applying devices, and label ironing and moistening devices, which will be described in detail, and under captions with such titles in the order mentioned.

*Bottle conveyor.*

This conveyor, said term referring to the entire conveying device, includes an adjustable guide or track for the bottles, comprising a pair of parallel longitudinal rails 25 above the adjacent portions of the tables 22. These rails are adjustable transversely with the tables and also adjustable up and down. Thus, screws or bolts 26 are threaded into the rails 25 at the outer sides thereof, and extend through vertical slots 28 of posts 27 having feet secured on the tables 22. Thus, by loosening screws 26, the rails 25 can be adjusted vertically, and each rail is supported from a pair of posts 27. In order to obtain accurate adjustment and to support the rails 25 in their adjusted position, adjusting screws 29 are threaded within the feet or bases of the posts 27, as best seen in Fig. 27, and the heads of the screws 26 rest on the heads of the adjusting screws 29. The screws 29 thus support the screws 26 and rails 25, and said screws 29 can also be adjusted for raising or lowering the rails 25. The rails 25 have upstanding guide flanges 31 offset toward one another to guide the bottles B between them, and a longitudinal channel 30 is disposed between the rails 25 underneath the flanges 31 in which the upper run of an endless conveyor chain 32 travels. The flanges 31 have openings 31' in which the wheels of the paste applying, label applying and ironing devices can move. The channel 30 is supported on transverse pins 30' secured to the rails 25, each pin being secured to one rail and projecting slidably through the other rail, to permit of the transverse adjustment of the rails with the tables 22, in adjusting the flanges 31 for bottles or objects of various widths or dimensions. The channel 30 being supported on the pins 30' which are carried by the rails 25, will be adjusted vertically with the rails, thereby raising or lowering the track or guide for the bottles, as desired or necessary for different sizes of bottles. The flanges 31 provide the opposite sides of the bottle guide or track, while the channel 30 forms the bottom thereof, in which the conveyor chain 32 travels, for moving the bottles or objects with the chain along the guide or track. The guide or track is adjustable as to width and vertical position, for different sizes of bottles or objects, and to cause the bottles to properly cooperate with the paste and label applying devices. The channel 30 can be of wood or other similar material to provide a noiseless support for the chain, and also reduce friction.

The sprocket chain 32 passes over sprocket wheels 33 at the ends of the machine beyond the ends of the guide or track, and said wheels are mounted on transverse shafts 34, each of which is carried by and journaled in a yoke 35 carried by a standard 36 which is adjustable vertically in a guide 37 carried by a yoke or cross piece 38 secured on the beams 21 at the corresponding end thereof. The standards 36 are adjustable vertically for raising or lowering the upper run of the sprocket chain 32, according to the vertical adjustment of the track in which the chain and bottles move. Thus, the lower end of each standard 36 has an ear 39' through which an adjusting screw 39 extends, being threaded upwardly into the yoke or cross piece 38, or other suitable means can be used for raising and lowering the standards.

The driving mechanism for the conveyor chain 32 includes a sprocket wheel 40 under which the chain 32 passes. A gear case 41 is suspended from a pair of cross rods 42 secured to beams 21, and a drive shaft 43 is journaled through said case, and has a pinion 44 thereon within the case meshing with a gear wheel 45 also within the case and secured on a counter shaft 46 journaled through the case. The sprocket wheel 40 is secured on the shaft 46 for angular adjustment, such as by means of a set screw 40', in order that the sprocket wheel 40 can be adjusted angularly for setting the chain 32 ahead or behind to advance or retard bottles or objects with respect to the devices which they pass. A pulley wheel 47 is secured to the shaft 43 and is operated by a belt 48 driven from a transverse counter shaft 480 journaled to the forward portion of the frame 20, and said shaft 480 is driven by an electric motor 49 or other prime mover which, as shown is supported on a shelf 50 supported from the frame 20, the armature shaft of the motor being connected by a belt 482 with a pulley wheel 481 secured on the counter shaft 480.

A clutch is provided between the shaft 480 and belt 48 in order to enable the machine to be started and stopped at will of the operator. This clutch is shown in detail in Fig. 29. A pulley wheel 483 around which the belt 48 passes, is mounted for rotation on the shaft 480 and has an inner annular lubricant channel 484 to which an oil duct 485 extends for supplying lubricant. A collar 486 is secured or fixed on the shaft 480, and has a telescopic fit with the hub of the wheel 483, and the said pulley wheel 483 has a clutch rim 487 surrounding and concentric with the collar 486. The confronting surfaces of the collar 486 and rim 487 are provided with ribs or splines 488 and 489, respectively, such as used in disk clutches, as well known, and a set of friction disks 490 is disposed between the collar 486 and rim 487. Every other disk engages the splines 488 of the collar 486, and the alternate disks engage the splines 489 of the rim 487, whereby one half of the disks rotate with the collar 486 and shaft 480, while the other disks rotate with the rim 487, and when the disks are released, the disks that rotate with the shaft 480 can revolve between the others, leaving the pulley wheel 483 at a stand still, whereas when the section disks are compressed into frictional contact, pulley wheel 483 is caused to rotate with the shaft 480.

In order to control the multiple disk clutch, a sleeve 491 is slidably mounted on the shaft 480, and has an enlarged and offset end portion 492 extending over one end portion of the collar 486 to compress the set of disks when the sleeve 491 is moved toward them. An annular plate 487' is preferably secured to the rim 487 to enclose the disks, and the end portion 492 of the sleeve 491 slides within said plate 487' thereby excluding dust and dirt from the disks. The clutch is normally closed by means of a coiled expansion spring 493 surrounding the shaft 480 and located within a recess 494 of the sleeve 491, and confined between the inner end of said recess and a collar 495 on the shaft 480 whereby the expansion of said spring will move the sleeve 491 to bring the disks into frictional contact, thereby closing the clutch and driving the pulley wheel 483 with the shaft 480. The sleeve 491 is slidable on the collar 495, and said collar is adjustably secured on the shaft 480, by means of a set screw 496, or the like, whereby said collar can be adjusted for regulating the tension of the spring 493. A ring 497 is mounted for rotation on the sleeve 491, and a thrust collar 498 is screw threaded or otherwise secured on the sleeve 491 and houses a ball or anti-frictional bearing 499 which is disposed between the collar 498 and ring 497, thereby reducing friction when the ring 497 is moved away from the disks, to move the collar 498 and sleeve 491 accordingly, to release the disks and thereby open the clutch.

In order that the clutch can be conveniently operated from the rear end of the machine, where the operator or attendant is usually positioned, the ring 497 is pivotally connected to a fork 500 secured on a longitudinal rock shaft 501 mounted in the frame 20, and an arm 502 secured to said rock shaft is connected by a link or bar 503 with an arm 504 secured to an upper longitudinal rock shaft 506 extending along one of the beams 21 to a point adjacent to the rear end of the machine. Said shaft 506 is journaled in bearings 507 secured to said beam, and a handle 508 extends upwardly from said shaft at the rear end of the machine, whereby said handle can be conveniently swung to swing the arm 504 upwardly, thereby similarly swinging the arm 502 and swinging the fork 500 to move the ring 497 and sleeve 491 against the tension of the spring 493, whereby to open the clutch, and disconnect the pulley wheel 483 from the shaft 480, thereby stopping all the parts that are operated from the pulley wheel 483 and belt 48. When the operator lets go of the handle 508, the spring 493 again comes into play for closing the clutch, thereby starting the machine again at once.

A second counter shaft 51 is journaled through the case 41 above the shaft 46 and has a gear wheel 52 secured thereon within the case and meshing with the gear wheel 45 to be driven thereby. Secured on the opposite protruding ends of the shaft 51 are sprocket wheels 53 and a sprocket wheel 54 is secured on the shaft 51 in the median longitudinal plane of the machine in which the conveyor chain 32 and guide or track are located, as well as the sprocket wheel 40.

At equally spaced intervals, the conveyor chain 32 is provided with fingers or lugs 55 projecting therefrom to contact with the rear ends or bottoms of the bottles and move them along the track within which the fingers project upwardly from the upper run of the chain.

The conveyor also includes means for holding the bottles down on the conveyor chain 32 and retarding the bottles slightly to hold them firmly against the fingers 55. Such means includes an arch or yoke 57 mounted for oscillation on the shaft 34 at the forward end of the machine, and carrying a shaft 58 driven from said shaft by means of sprocket wheels 59 and 60 on the shafts 34 and 58, respectively, and a chain 61 connecting the wheels. A pair of arms 62 are mounted for oscillation on the shaft 58 and project rearwardly within the arch 57 and carry the shaft 63 which is movable in arcuate slots 64 in the sides of the arch, whereby the shaft 63 can be adjusted upwardly and downwardly. In order to maintain the shaft 63 in its adjusted position, clamp plates 65 engage said shaft at opposite sides of one side member of the arch, and said plates are connected by a screw or bolt 66, which can be tightened so that said plates clamp the side member of the yoke, thereby preventing the shaft 63 from being displaced upwardly or downwardly without intentional adjustment. A pulley wheel 67 is secured on the shaft 63 between the arms 62 and an endless belt 68 passes around the pulley wheel 67 and extends longitudinally over the track and upper run of the chain 32. In order to support the belt 68, a rod or tube 69 extends through the upper portion of the yoke 57, which has a vertical slot 70' receiving said rod for vertical adjustment, and the rod is secured to said yoke by means of nuts 70 threaded on the rod and bearing against the opposite sides of the yoke. Said nuts 70 when loosened, enable the rod 69 to be raised or lowered for purpose of adjustment. The rod 69 extends longitudinally above the guide, and arch-shaped hangers 71, of which there may be any suitable number, are suspended from the rod 69, said hangers having pinched clamps 72 embracing the rod 69 and made fast thereon by means of screws 73 or the like. The hangers 71 straddle the belt 68, and a pulley wheel 74, of substantially the same diameter as the pulley wheel 67, is journaled within that hanger 71 at the free or rear end of the rod 69 remote from the arch 57, and the belt 68 passes over the pulley wheels at the limits of its travel. Smaller intermediate pressure wheels 75 located between the upper and lower runs of the belt 68, are mounted for rotary and vertical movements within the remaining hangers 71, the axles 76 of said pressure wheels projecting within the vertical slots 77 in the limbs of the hangers. By loosening the clamps 72, the hangers 71 and pressure wheels can be distributed to desired longitudinal points, in order that the pressure of the wheels 75 on the lower run of the belt 68 will be at such points most needed to hold bottles down firmly on the conveyor chain 30. The bottles are carried between the upper run of the chain 32 and the lower run of the belt 68, and the weight of the wheels 75 presses the belt 68 down to rest firmly on the bottles. The shaft 63 has a gear wheel 78 secured thereto meshing with a gear wheel 79 secured to a shaft 58, in order to drive the belt 68; and the gear wheel 78 is slightly larger in diameter than the gear wheel 79, whereby the belt moves at a slightly less speed than the chain 32, but in the same direction forward to convey the bottles. The belt 68 in traveling at a slightly less velocity than the chain 32 and in pressing on the bottles, retards the bottles slightly on the chain 32, and thus holds the bottles firmly against the fingers 55, to prevent the bottles being displaced or jumping forward ahead of the fingers 55.

The arch 57 in carrying the rod 69 and other parts which support the belt 68, enables the belt to be raised and swung out of the way, with the arch 57, which can turn on the shaft 34. In this manner, the belt 68 can be swung upwardly to uncover the track, and thus give access to the bottles and conveyor chain therein. The rod 69 can also be adjusted vertically with respect to the arch 57 to raise and lower the retarding belt 68 according to the requirements. The yoke 57 also preferably carries a guard 79' for the gear wheels 78 and 79, and means is provided for supporting the rod 69 when lowered. Thus, a collar 690 is secured on the rod 69 and has clamping screws 691 movable downwardly into vertical slots 692 in posts 693 rising from the rails 25, near the rear ends thereof. The screws 691 thus pass in the slots 692 when the rod 69 is moved downwardly into normal position, and the screws 691 can be tightened to clamp the posts 693 to the collar 690, thereby supporting the rear end of the rod in the desired vertical position, and when the screws are loosened, the rod can be readily swung upwardly.

Bottle magazine.

The bottle magazine, shown in detail in Figs. 17, 18, 19 and 20, for feeding the bottles one at a time to the conveyor embodies a transverse trough in which the bottles are disposed transversely of the trough, side by side, to move transversely of the machine and themselves onto the conveyor chain 32 at the rear end of the machine. The trough of the magazine comprises a horizontal bottom plate 80 and upstanding side flanges 81. The bottle magazine or trough has adjustable means therein for guiding bottles, including a guide bar 82 for the rear ends or bottoms of the bottles disposed longitudinally in the trough on the bottom plate thereof, and a guide bar 820 disposed longitudinally on the plate 80 and arranged for contact of the shoulders or forward portions of the bottles against same, as seen best in Fig. 17. The guide bars 82 and 820 receive the bottles between them, and guide the bottles for transverse movement to the conveyor chain 32. The bars 82 and 820 are adjustable transversely of themselves, in the trough, said bars having depending stems or bolts 821 projecting through transverse slots 822 in the bottom plate 80 and having nuts 823 thereon for clamping the bars in their adjusted positions. By loosening the nuts, the bars can be adjusted for bottles or other objects of various lengths, in order to properly guide them to the conveyor chain 32, to which the magazine or trough extends from one side thereof. The guide bars 82 and 820 are disposed at opposite sides of a longitudinal slot or opening 824 provided in the bottom plate 80 in which a belt 25 travels, and on which belt the bottles rest.

In order to cushion the bottle which is delivered from the magazine over the conveyor chain 32, a stop block 83 is disposed transversely of the trough or magazine at the delivery end thereof and at that side of the chain 32 opposite to the magazine, said block being disposed longitudinally of the machine, as seen in Fig. 18. The block 83 is supported by an angle iron 830, as seen in Fig. 19, and a supporting block 831 for the chain 32 is secured between the angle iron or bracket 830 and inner or delivery end of the bottom plate 80 of the trough or magazine, thereby supporting the chain 32 where it passes the magazine and at the point where the bottles are shifted laterally onto the conveyor chain. A rearwardly projecting leaf spring buffer 833 has its forward end secured to the forward end portion of the block 83 at the inner side in substantially the vertical plane of the corresponding side flange 31 of the guide or track, with the buffer extending across the delivery end of the magazine, and the block 83 has a recess 832 enabling said buffer 833 to spring outwardly away from the magazine and conveyor chain 32. The bottle which is shifted from the magazine onto the chain 32 will be stopped by the spring buffer 833, thereby cushioning the shock, which might otherwise occur, especially at the rear end of the bottle, and when the corresponding finger 55 contacts with the rear end of the bottle on the chain, the bottle will be guided in the longitudinal position by the buffer as the bottle is carried forwardly. The spring buffer 33 after being pushed into the recess 832 by the movement of the bottles with the belt 825, will rebound partially if not completely, thereby assisting in positioning the bottle on the chain 32 ready for the forward movement of the bottle in the conveyor track. The buffer 833 eliminates the sudden stopping of the bottles and consequent jar and occasional breakage of the bottles and serves as a yielding stop and guide.

The magazine or trough and belt 25 are supported from a pair of horizontal rods 834 disposed transversely of the machine or longitudinally underneath the trough parallel therewith, and said rods 834 extend through sleeves 835 of a plate 836 secured to a bracket 837' extending from one side portion of a transverse arch 837 secured on the beams 21 near the rear ends thereof. A pair of U-shaped bearing members 829 are mounted on the rods 834 near the opposite ends thereof, and support the axles 827 of the pulley wheels 826 of the belt 825, over which said belt passes, with the upper run traveling in the slot or opening 824 of the bottom plate. Standards 838 which are of U-shape, similar to the bearing members 829, are also supported on the rods 834 and the plate 80 is secured on the upper ends of the standards. The members 829 and standards 838 have sleeves 839 mounted slidably on the rods 834, for adjustment and secured to said rods by means of set screws 839' or the like. The inner axle or shaft 827 is operatively connected with the corresponding shaft 34 by means of bevel gears 800 or the like, which are protected by a guard or shield 801.

In order to hold the remaining bottles in the magazine, when one bottle is moved therewith onto the conveyor chain 32, so as to avoid the breakage of the bottles and to also eliminate noise, an automatic detent device is provided at the delivery end of the magazine. This device comprises a horizontal plate 802 disposed over the delivery end of the magazine, and over the chain 32, as seen in Fig. 19, under which the bottles move, and this plate also serves to hold the bottles down in place as they move from the magazine to the chain 32. The plate 802 has an upstanding flange 803 overlapping a flange 804 depending from a clamp 805 embracing the rod 69 near the free or rear end thereof, and bolts 806 clamp the flanges 803 and 804 together. Said flanges have vertical slots 807 in which the bolts extend, enabling the plate 806 to be raised and lowered for bottles or objects of different sizes. That end of the plate 802 nearest the receiving end of the magazine is curved upwardly, as at 808, to serve as a deflector for pushing down the bottles as they move under the plate 802, thereby bringing the bottles into horizontal position before moving onto the chain 32, should the bottles be tilted slightly in the magazine.

The detent means is mounted on the plate 802, and comprises a rock shaft 809 journaled in bearings 810 on the plate 802, said shaft being disposed longitudinally over the delivery end of the magazine, or transversely over the chain 32. A rearwardly and downwardly extending arm 811 is secured to the shaft 809 directly over the conveyor chain 32, and its rear end extends downwardly slightly below the horizontal plane of the upper surfaces of the bottles in the magazine, beyond the shoulders or forward portions thereof, as seen in Fig. 17. A second arm 812 is secured on the shaft 809 by means of a set screw 812', or the like, to enable said arm 812 to be adjusted angularly and longitudinally on the shaft, and said arm has a downwardly-opening socket 813 in which detent 814 is slidable upwardly and downwardly. The plate 802 has a slot 814' parallel with the shaft 809 permitting of the adjustment of the arm 812 to different longitudinal positions with respect to the magazine, for the proper contact of the detent 814 with the bottle or object next to the one which is being removed from the magazine. A screw 815 passes slidably downward into the socket 813 and is secured within the detent 814, whereby to raise the detent with the arm 812 and limit the projection of the detent from the socket. The detent is yieldable, being projected by means of a coiled expansion spring 816 within the socket confined between said socket and detent, thereby enabling the detent to yield when brought to bear on a bottle or object underneath, as seen in Fig. 20. The arm 812 is adjusted to the proper angular and longitudinal position on the shaft 809, whereby when the arm 811 is swung upwardly, the detent 814 will bear on the bottle next to or following the bottle which is on the chain 32 to be or in the act of being removed from the magazine, as seen in Fig. 20, whereby to hold the second bottle down tightly on the bottom plate, thereby preventing the belt 25, which operates continuously, from shifting the rear ends of the bottles toward the chain 32, which would occur otherwise, if the detent were not used. The shaft 809 has a third arm 817 secured thereto to swing with respect to a stem or rod 818 secured to the plate 802, and coiled wire springs 819 are disposed on said rod above and below the arm 817, the lower spring bearing on the plate 802, and the upper spring bearing against a nut 819' secured on the upper terminal of said rod. The springs 819 provide for the yielding motion of the shaft 809 and the arms carried thereby, the upper spring 819 returning the arms to normal position when a bottle has passed from in under the arm 811, and the lower spring 819 cushioning the arms when returned to normal position.

The operation of the bottle magazine is as follows: The belt 825 operates continuously with the chain 32, and the upper run of the belt 825 moves toward said chain, thereby creating a tendency for the bottles in the magazine to move with the belt toward the chain. The bottles are placed in the magazine on the belt 825, and are moved by the belt against one another, side by side, as seen in Fig. 19. The first bottle in the magazine is therefore shoved by the others from the delivery end of the magazine onto the conveyor chain 32, as seen in Fig. 19, in rear of the arm 811, as seen in Fig. 17, the spring buffer 833 cushioning the bottle as it is moved over onto the chain 32. The bottle is moved onto the conveyor chain before the next finger 55 reaches the magazine, and when said finger comes into contact with the bottle on the chain, the bottle is carried forwardly from the magazine into the conveyor track between the flanges 31 of the rails 25, the chain 32 supporting the bottle and being in turn supported by the channel 30.

When the bottle is moved with the chain 32 from the bottle magazine, it passes under the arm 811, and swings said arm upwardly to a position as seen in Fig. 20. This swings the arm 812 downwardly, and brings the detent 814 against the next bottle, near the rear end thereof, thereby holding the second bottle down on the plate 80, against movement toward the chain 32 while the first bottle is passing from the magazine with the conveyor chain, as seen in Fig. 20. The upward movement of the arm 811 raises the arm 817 to compress the upper spring 819, so that when the bottle has passed the arm 811, the upper spring 819 swings the arm 811 down again, and raises the detent 814, thereby permitting the bottles in the magazine to move ahead one step, bringing the next bottle onto the chain 32 to be carried with said chain by the succeeding finger 55. Without the use of this detent device, the belt 825 has a tendency for shifting the rear ends of the bottles toward the chain 32, during the movement of the first bottle from the magazine, thereby creating more or less noise due to the misplacing of the bottles and the rubbing action of the first and second bottles as the first bottle passes away from the magazine. Furthermore, by holding the second and following bottles in the magazine during the removal of the first bottle therefrom, this will eliminate the breakage of the bottles, because the first bottle can move from the magazine without the injurious pressure thereagainst of the other bottles due to frictional advancing movement of the bottles in the magazine by the belt 825. The detent device therefore smoothens the operation at the bottle magazine and makes the operation less noiseless as well as eliminating the bottle breakage that might, otherwise occur.

*Paste applying devices.*

The paste applying devices, one of which is shown in detail in Figs. 21, 22 and 23, are located at the opposite sides of the conveyor track next in front of the bottle magazine, and are carried by the tables 22. Each of the devices includes a paste applying wheel 84 at one side of the track, secured to the upper end of a vertical shaft 85, and a curved paste pad 86 is secured to the periphery of the wheel 84 at one point to contact with one side of the bottle, while the remainder of the peripheral surface of the wheel 84 does not touch the bottle. Each paste applying device includes a gear case 87 carried by the rear edge of the respective table 22, whereby said devices are adjusted toward and away from one another, as the guide or track is made wider or narrower, and thus assure of the proper contact of the paste pads 86 with the bottles of various sizes. The shaft 85 of the device is journaled through the top of the case 87. A paste pot 88 is mounted on the case 87 at the outer side of the shaft 85 and has a removable cover 89, through an opening of which the outer portion of the wheel 84 extends to overhang the paste pot. A paste transferring wheel 90 is rotatable in the same horizontal plane as the wheel 84, and is secured to the upper end of a vertical shaft 91 above the paste in the pot. The shaft 91 is journaled in an upstanding bearing 92 carried by the top of the case 87, and the bottom of the pot 88 has an upstanding sleeve 93 forming an inner wall for the pot surrounding the bearing 92 and shaft 91. A paste elevating disk 94 rotatable in a vertical plane is secured to the inner end of a horizontal shaft 95 journaled through an adjustable bushing 96 threaded through the outer wall of the pot 88. The bushing 96 bears at its inner end against the hub of the paste elevating disk 94, and presses the face of the disk 94 against the periphery of the wheel 90, and the pressure can be regulated by adjusting the bushing 96, which has a knob 97 at its outer end for that purpose. The disk 94 contacts with the wheel 90 above the center of said disk, and the lower portion of the disk dips in the paste, so that the rotation of the disk elevates a film of paste on the face thereof and spreads it on the periphery of the transferring wheel 90, which is so spaced from the paste applying wheel 84, that only the paste pad 86 contacts with the wheel 90 to receive paste therefrom.

The actuating mechanism of the paste applying devices includes a transverse shaft 98 journaled through the gear cases 87, and bevel gears 99 secured to the lower ends of the shafts 85 and 91 within the cases 87 mesh with similar gears 100 feathered on the shaft 98 so that the wheels 84 and 90 are rotated in the proper direction, and the gears 100 can slide on the shaft 98 when the cases 87 are adjusted with the tables 22. The gears 100 dip in lubricant in the gear cases 87, to lubricate the mechanism. Pulley wheels 101 are secured to the outer ends of the shafts 95 and remote ends of the shaft 98 and belts 102 pass over said pulley wheels to rotate the paste elevating disks 94. A sprocket wheel 103 is secured to the shaft 98 at the center thereof, and a sprocket chain 104 passes over said sprocket wheel and under the sprocket wheel 54 above described, to be operated thereby and therefore operate the paste applying devices as the conveyor chain is moved.

Each paste applying device is provided with means for scraping or wiping the paste from the transferring wheel 90, to remove the surplus paste from said wheel, so that only a desired thin film of paste is transferred to the bottle, for purpose of economy and to prevent the machine being gummed up. As shown, two paste scrapers or wipers 104 and 105 are used, one for scraping or wiping the surplus paste from the wheel 90, whereby to present a desired thin film of paste for the contact of the paste pad 86, and the other scraper for removing practically all of the paste from the periphery of the wheel 90 before reaching the disk 94, to provide for evenness of the paste on the periphery of the wheel 90. The scrapers 104 and 105 comprise blades disposed at an angle to the periphery of the wheel 90, and said scrapers are secured to vertical spindles 400 having their lower portions mounted for oscillation in opposite brackets 401 carried by a collar 402 secured by means of a set screw 403, or the like, on the sleeve 93, and permitting the scrapers to be adjusted angularly and vertically with respect to the wheel 90 to properly cooperate with said wheel. The scrapers 104 and 105 are disposed above the brackets 401 and are adjusted angularly with the spindles 400. Thus, the brackets have upstanding flanges 404 at their outer ends, through which adjusting screws 405 and 406 are screw threaded to bear against the backs of the scrapers at opposite sides of the spindles 400. The inner ends of the scrapers or wipers 104 and 105 are presented to the periphery of the wheel 90, with the scrapers at an angle to such periphery, and by loosening the screws 406 and tightening the screws 405, the ends of the scrapers are adjusted away from the periphery of the wheel 90, permitting a greater thickness of paste to pass the scrapers, whereas when the screws 405 are loosened and the screws 406 tightened, the ends of the scrapers are adjusted closer to the periphery of the wheel 90, thereby reducing the thickness of the film of paste which can pass the scrapers. Each scraper has a lug 407 at the lower end of the scraping edge, extending snugly under the lower edge of the periphery of the wheel 90, whereby to scrape or clear the paste from the lower edge of the periphery of the wheel 90, due to the running of the paste downwardly from the periphery so as to drip or hang therefrom. As the periphery of the wheel 90 rolls against the disk 94, it receives the paste therefrom, and in passing the first scraper 104, the surplus paste is removed from the periphery of said wheel, and also from the lower edge of said periphery, leaving only a desired film of paste on the wheel 90 for the contact of the paste pad 86, and the periphery of the wheel 90 in then passing the second scraper or wiper 105 will have practically all of the paste removed therefrom, before again receiving a fresh supply of paste from the disk 94. In this way, the two scrapers or wipers are of advantage, the first one removing the surplus paste and leaving a desired thin film of paste to be transferred to the paste pad 86, while the second scraper will clean the wheel 90, to avoid unevenness in the paste on the periphery of the wheel 90, such as might result from the removal of portions of the film of paste only by the pad 86. The lugs 407 prevent the accumulation of paste below the lower edge of the periphery of the wheel 90, which would otherwise occur, resulting in the accumulation and drying of the paste under the wheel. It will be apparent that the paste applying devices operate in harmony with the conveyor chain 32, so that the pads 86 contact with the bottles as they pass between said devices, and thus apply the paste to the opposite sides thereof, within areas bounded by the outlines of the pads or within depressions in the bottles. The peripheries of the transfer wheels 90 are kept supplied with paste by the elevating disks 94, and the pads 86 in contacting with the wheel 90 are replenished with paste for each bottle.

*Label applying devices.*

The label applying devices, as shown in detail in Figs. 3 to 16, inclusive, are located at the opposite sides of the conveyor track forwardly of the paste applying devices, and each of the label applying devices includes a label applying or transferring wheel 106 rotatable in the horizontal plane of the wheels 84 and 90 at one side of the track, with its periphery spaced from the bottles so as not to contact therewith. The label applying wheel 106 is supplied with labels one at a time from a label magazine carried by the slide 107 movable longitudinally at one side of the machine in a guide 108 provided on the corresponding table 22. The two label applying devices are carried by the tables 22 so as to be adjusted like the paste applying devices for accommodating bottles of different sizes.

The label magazine of each label applying device includes a bottom plate 109 supported from the slide 107, and forming the bottom of the magazine, and transverse side members or angle irons 110 and 110' on the plate 109 form the sides of the magazine in which the stack of labels L are placed. The label magazine is adjustable in width to accommodate labels of different lengths. For this purpose, a pair of rods 111 extending transversely of the side members 110 and 110' are secured within lugs 201 and 202 with which the side member 110' is provided at its outer and inner ends, and said rods pass slidably through similar lugs 203 and 204 at the outer end inner ends of the member 110 which is slidable transversely of itself longitudinally on the plate 109. The ends of the rods 111 opposite to the lugs 201 and 202 are secured in lugs 205 rising from the plate 109, and the lugs 203 and 204 are bifurcated for receiving nuts 112 screw threaded on the rods 111, whereby said nuts in being rotated, will shift the side member 110 of the magazine toward or away from the side member 110' to adjust the magazine in width to the length of the particular label used, and to hold the magazine in its adjustment for such label.

The label magazine is supported from its slide 107 for relative vertical and horizontal adjustment, whereby to regulate the positioning of the labels on the bottles, by advancing or retarding the position of the labels on the label wheel 106 and raising or lowering the label on said wheel when picked from the magazine. Thus, vertical screws or posts 115 are screw threaded down into the slide 107 and are swivelled, as at 208, within yokes 206 supporting parallel slide rods 114. The screws or posts 115 are maintained in their adjusted positions by means of lock nuts 207 thereon bearing against the slide 107, and the plate 109 has depending lugs 209 slidable on the rods 114 for the horizontal adjustment of the label magazine longitudinally of the labels therein. A screw 113 mounted for rotation in the yokes 206 is threaded through one of the lugs 209, and has a knob 210 for rotating it, whereby to adjust the plate 109 longitudinally to the desired position. By loosening the nuts 207, the posts 115 can be rotated to screw them downwardly or upwardly within the slide 107, thereby lowering or raising the plate 109 with the rods 114 and yokes 206, to position the label magazine vertically, as desired. These adjustments of the label magazine are used for properly positioning the labels on the bottles, both longitudinally and transversely of the bottles, as will hereinafter more fully appear.

The labels are advanced in the magazine toward the wheel 106 by a follower arm 117 having its free terminal bearing against a follower plate 116 slidable in the magazine on the plate 109 between the side members 110 and 110'. The arm 117 extends through a slot 118 in the member 110', and bears against a rib 119 on the plate 116, whereby to effectively transmit the pressure from the arm to said follower plate to advance the follower plate in the magazine evenly. The arm 117 is secured to a member 120 mounted for turning movement on a post 121 secured on the plate 109 beyond the side member 110' of the magazine, and a torsional spring 122 connects the member 120 and post 121 whereby to exert a tension for swinging the arm 117 toward the inner end of the magazine, for advancing the labels therein with a substantially uniform pressure. To insert additional labels, this can be conveniently done, by pushing the follower plate 116 outwardly or backwardly, moving the arm 117 with it, and leaving a space between the labels in the magazine and the plate 116 into which the additional labels can be inserted.

The inner or delivery end of the magazine is provided with means for retaining the labels in the magazine and for the efficient picking of the labels one at a time from the magazine by the label wheel 106. The lug 204 has a transverse slot 211 in which is slidably fitted a slotted block 212, and a label retaining and separating finger 123 is pivoted, as at 213, within the slot of the block 212, and the sharp end of the finger projects from the block 212 into the receptacle of the label magazine to overlap the forward end of the first or forward label in the magazine, it being noted that the labels in the magazine are reversed longitudinally from the position in which they are applied to the bottles, so that the forward ends of the labels in the magazine extend rearwardly of the machine. An expansion spring 214 is confined between the block 212 and the opposite end of the finger 123, whereby to swing the sharp active end of the finger into the magazine toward the outer or back end thereof. The forward ends of the labels are thus pushed by the follower plate 116 against the finger 123, which is swung against the tension of the spring 214, to bring the foremost label of the stack to a position to be removed by the label wheel 106, as hereinafter more fully described. In other words, the finger 123 has a tendency to move or swing toward the labels in the magazine, and is yieldable with the labels under the pressure of the follower plate 116 and means for advancing the labels in the magazine. The block 212 can be adjusted in the slot 211 to project or retract the end of the finger 123 more or less within the magazine, and the block 212 is held in its adjusted position by means of a set screw 215. The active end of the finger 123 is curved to enter the magazine and project toward the labels, as well as being sharpened to facilitate the separation of the forward ends of the labels in picking the labels from the magazine.

At the opposite side of the mouth of the magazine, with respect to the finger 123, there is a label detaining and separating pin 124. This pin 124 is carried by a tubular stem 216 extending slidably through the lug 202 of the member 110' transversely thereof, and the pin is secured in place by means of a rod 217 extending longitudinally within the stem 216. The terminals of the stem 216 and rod 217 which project from the lug 202 into the magazine in overlapping relation with the rear ends of the labels, are provided with obliquely disposed apertures 218 in which the pin 124 is inserted with its point extending obliquely at an acute angle toward the side member 110' of the magazine for the contact of the rear end portion of the foremost label in the magazine. A nut 219 is screw threaded on the other terminal of the rod 217, and bears against the corresponding terminal of the stem 216, whereby said nut in being tightened, will pull the rod 217, and thus bind the pin 124 in place within the stem. The stem 216 can be adjusted longitudinally and angularly within the lug 202 and is secured in its adjusted position by means of a set screw 220 in said lug. The rear ends of the labels in being advanced by the follower plate 116 are limited in their movement by the contact of the foremost label with the point of the pin 124, and said pin is also of utility for accomplishing the separation of the labels when one of them is being removed from the stack, as will hereinafter more fully appear.

In order to depress the labels in the magazine and hold them down on the plate 109, arms 221 extend over the members 110 and 110' to overhang the receptacle for the labels, and said arms are pivoted to and adapted to be clamped or secured to bosses 222 of the lugs 202 and 204 by means of pivot and clamping screws 223 which, when loosened, permit said arms to be raised and lowered. The arms 221 have T-heads 224 overhanging the label receptacle, and said heads are adjusted so as to contact with and bear on the upper edges of the labels, whereby to keep the labels from working upwardly in the magazine. Furthermore, the ends of the heads 224 under which the labels move, when advanced in the magazine, are curved upwardly slightly, as at 225, whereby to serve as deflectors for pushing down any labels that are raised above the plate 109, thus assuring of the labels being delivered from the magazine in the proper vertical position. The arms 221 are curved so as to extend over the upper edges of the side members 110 and 110' of the label magazine, as seen in Fig. 12.

It is preferable to provide a transverse stop wire 226 on the bottom plate 109 of the magazine underneath the stem 216, whereby to prevent the lower edges of the labels from working under the pin 124 and stem 216, so as to be apt to become displaced or to slip off of the plate 109. This stop wire 226, as shown, extends underneath the member 110' which has a lower transverse notch or groove 227 receiving said wire, whereby the wire is clamped securely on the plate 109 when the member 110' is fastened down by its securing bolts 228. By loosening the member 110', the wire 226 can be adjusted to project or retract same in the magazine, as desired. This stop wire precludes any possibility for the lower edges of the labels working under the stem 216, especially under certain conditions when this is apt to happen, when inserting labels into the magazine or the like.

As an added safety feature, to prevent the labels from falling or escaping accidentally from the mouth of the magazine, a block 229 is mounted on the rod 111 over the mouth of the magazine, and is adjustable slidably and rotatably on said rod, being held in its adjusted position by means of a set screw 230 or the like. A stop finger 231 is slidably disposed across one side of the block 229 and has a longitudinal slot 232 receiving a clamping screw 233 carried by said block, whereby said finger can be adjusted upwardly and downwardly. The block 229 and finger 231 are adjusted, as seen in Fig. 10, so that the lower end of said finger extends downwardly slightly below the lower edge of the foremost label in the magazine spaced therefrom, whereby should the labels lean from the receptacle, the upper edges thereof will be held back by the finger 231, thus preventing the labels from spilling from the magazine. The finger 231, however, does not interfere with the picking of the labels from the magazine.

The label applying wheel 106 at each side of the conveyor track is carried for transverse movement toward and away from the track at any adjustment of the corresponding table 22, by a slide 125 movable in a guide 126 on said table. This slide 125 has an upstanding post 127 on which the wheel 106 turns, said wheel having a hub or bushing 128 fitted therein and surrounding said post. A screw 129 passes downwardly through the upper central portion of the wheel 106 and takes into the post 127 or other suitable means can be used for holding the wheel 106 down on the post. A bevel gear 131 is secured on the hub 128 below the wheel 106 to rotate with said wheel, and an arcuate label pad 132 is secured to the wheel 106 at one point of its periphery and has an opening or port 133 near its forward end, communicating with the passage 134 in the wheel 106. An inverted cup-shaped valve 130 is fitted over the post 127, with its lower end bearing on a washer 130' fitted on the post around the base thereof, and the valve 130 is clamped down in place by the screw 129, to maintain the valve in its angular adjustment. The valve 130 is fitted on the post with an air space above the upper end of the post within the valve, and the hub 128 of the wheel 106 is rotatable on the valve, the passage 134 of the wheel extending through said hub to register with an arcuate port 135 of suitable length with which the valve 130 is provided above the upper end of the post. The port or slot 135 is of a length for the registration of the passage 134 therewith from the time the port 133 reaches the label magazine to the time that the port reaches the bottle in applying the label. The post 127 and slide 125 have an air suction passage 137 leading from the upper end of the post to one side of the slide 125, which passage communicates at all times with the port or slot 135 of the valve, and with the passage 134 when it registers with said valve slot or port. By loosening the screw 129, the valve 130 can be adjusted angularly for properly timing the establishment and shutting off of the flow of air through the passage 134 as the wheel 106 rotates.

The operating mechanism for the label applying devices includes a transverse shaft 143 for each label applying device journaled longitudinally within the corresponding slide 125 and having a bevel gear 144 secured thereon meshing with the bevel gear 131. The slide 125 is hollow or chambered, so that it can contain lubricant for lubricating the gears and bearings. The shaft 143 at each side of the conveyor track is operated from a sprocket wheel 145 secured on a cam shaft 143' alining with the shaft 143 beyond the outer end thereof, and each sprocket wheel 145 is connected by an endless sprocket wheel 146 with the corresponding sprocket wheel 53 on the shaft 51. The shaft 143 is shiftable longitudinally with the slide 125, and a sliding connection between the sprocket wheel 145 and shaft 143 is therefore provided, including a sleeve 234 secured to the hub of the sprocket wheel 145 and receiving the outer terminal of the shaft 143, which sleeve has secured therein plates or pieces 235 providing channels or grooves receiving rollers 236 carried by the outer terminal of the shaft 143. The rollers 236 serve as feathers carried by the shaft 143 working within the grooves or featherways of the sleeve 234, thus driving the shaft 143 from the sleeve 234, and enabling the shaft 143 to slide longitudinally with minimum friction, due to the rolling action of the rollers 236.

The slides 107 of the label magazines are reciprocated from the cam shafts 143' on which the sprocket wheels 145 are secured, said shafts 143' being journaled for rotation within cases 147 secured on the side members of the frame 120 within recesses in the tables 22. Cylindrical cams 148 are secured on the shafts 143' within the cases 147 and have cam grooves 149 in the peripheries thereof, which are developed to move the label magazines properly, as hereinafter more fully explained. Levers 150 have rollers 151 working in the cam grooves 149, and said levers are fulcrumed below the cams 148 within the cases 147, as at 152, and the long arms of the levers which extend from the cases 147, are of angular form, so that they extend to substantially the longitudinal lines of movement of the slides 107. The outer bearing of each case 147 for the shaft 143' is a thrust bearing provided with an adjusting screw 237 to take up the thrust. The long arm of each lever 150 is connected to the corresponding slide 107 by means of a link 238 pivoted at one end to the slide 107 underneath same, as seen in Figs. 7 and 8, and the other end of the link 238 has a pivot 239 adjustable within an elongated transverse slot 240 with which the end of the long arm of the lever 150 is provided. Adjusting screws 241 are carried by the lever 150 and enter the slot 240 from the opposite ends thereof, whereby to adjust the pivot 239 and maintain it in its adjustment, and the screws 241 are held against accidental loosening by means of lock nuts 241' thereon. This adjustment of the pivot 239, enables the pivot to be adjusted transversely, to bring it nearer to or farther away from the fulcrum 152 of the lever 150, thereby decreasing or increasing the throw or movement of the slide 107 for labels of different lengths, and the like. The cams 148 being operated simultaneously with the label wheels 106 will operate the label magazines in synchronism with the label wheels, and the grooves 149 of the cams are properly developed to move the label magazines in the desired manner, such as explained in connection with Figs. 13, 14 and 15, as hereinafter set forth, for the proper picking of the label from each magazine by the pad 132 of the corresponding label wheel.

Each of the label applying devices includes automatic means for preventing the pads 132 from being gummed up, such as by shifting the slide 125 and label applying wheel 106 to and from label applying position, and for this purpose there is employed an air suction contrivance 153 hung, as at 160, from the corresponding table 22, having a casing 154 in which a diaphragm 155 is clamped between the sections thereof. A stem 156 is secured to the diaphragm and projects inwardly through the inner section of the casing and is pivoted to one arm of a lever 157 fulcrumed to a bracket 158 secured on the table 22, and the other arm of the lever is slotted or bifurcated and engages a pin 159 on the slide 125. The slide 125 is moved outwardly to label-receiving position by means of a coiled expansion spring 141 confined between the slide 125 and an adjusting screw 140 carried by the table at the inner side of the slide 125, said screw 140 having a socket receiving the spring, and the slide 125 having a pin 138' around which the spring is disposed and arranged to contact with a stop screw 139 carried by the screw 140 and projecting within the socket of the screw and spring, as seen in Fig. 3. The pin 138' in striking the screw 139 will limit the inward movement of the slide 125 and wheel 106 to label applying position, and the movement of the slide and wheel outwardly to label-receiving position is limited by an adjusting screw 142 carried by the bracket 158. A tube 161 is connected to the slide 125 in communication with the passage 137 and said tube 161 and a tube 162 are connected to the casing 154 at that side of the diaphragm 155 opposite to the stem 156, whereby said tubes are in communication with one another, and the air suction contrivance 153 is disposed between said tubes to be operated by the air suction. The two tubes 162 of the two label applying devices are connected to a pipe 163 leading to the exhaust side of the pump 138 connected by an endless chain 164 with the shaft 480, to be operated thereby. The air suction is thus continuously present in the tubes 162 and casings 154, but when air can enter said casings by way of the tubes 161, the tension of the springs 141 overcomes the suction against the diaphragms 155, thereby shifting the slides 125 and wheels 106 outwardly away from the conveyor track toward the label magazines, whereas when the flow of air into the casings 154 through the tubes 161 is shut off, the full force of air suction is exerted against the diaphragms 155, overcoming the tension of the springs 141 and thereby drawing the diaphragms 155 and swinging the levers 157 whereby the slides 125 and wheels 106 are shifted inwardly, as seen in Fig. 3.

Means is provided for each label wheel, to prevent the label wheel from moving to label applying position when a label is refused by said wheel, and for this purpose, the label wheel 106 has an air inlet passage 183 diametrically opposite to the passage 134, leading through the hub 128 to register with the slot or port 135 of the valve 130 alternately with respect to the passage 134, and an air inlet nipple 184 is carried by the wheel 106 in communication with the passage 183. The entrance of air into the nipple 184 and passage 183 is controlled by an arcuate valve strip 185 secured to the lower surface of the supporting plate or yoke 186. The plate or yoke 186 has its end portions fitted on posts 187 secured at their lower ends to lugs 188 carried by the guide 126, and nuts 189 are disposed on the upper terminals of the posts 187 to hold the plate or yoke 186 in the proper vertical position. The valve strip 185 and air inlet nipple 184 are so arranged, that when the wheel 106 is in label-receiving position, as seen in full lines in Fig. 16, the nipple 184 travels beyond the outer edge of the strip 185, so that air can enter said nipple, whereas when the wheel 106 is shifted to label applying position, as seen in dotted lines in Fig. 16, the nipple 184 is carried under the strip 185, which, in bearing over the nipple 184 due to the resiliency of the yoke or plate 186, will close said nipple and prevent the entrance of air into the passage 183 during the time that the pad 132 is approaching and moving adjacent to the conveyor track. The strip 185 is provided at one end with an oil duct 190 for receiving oil which will be carried by the nipple 184 along the lower surface of the valve strip, to reduce friction between said nipple and strip. The function of this device is to admit air to the casing 154, in the absence of the label carried by the pad 132, when the passage 134 is closed by the valve 130 after the pad 132 reaches and moves adjacent to the conveyor track, thereby preventing the contrivance 153 from shifting the label wheel to applying position, as would otherwise occur and as hereinafter more fully set forth.

In order to maintain the wheel 106 in label applying position, during the picking of the label from the magazine, for the proper transfer of the label from the magazine to the pad 132, a retaining plate 191 is secured on a lug 192 provided on the wheel 106 substantially opposite to the port 133, and said plate 191 has an outer curved edge concentric with the wheel 106 to contact with and slide past a plate 193 secured to the set of hangers 71 which is disposed between the two label applying devices, said hangers 71 having the plates 193 on opposite sides thereof for the two label wheels. The plates 191 are supported above the nipples 184 and pass over the yokes or plates 186.

The operation of the label applying devices is briefly described as follows: As the wheels 106 rotate and the pads 132 thereof move toward the label magazines, as indicated by the arrows in Figs. 13, 14 and 15, the magazines are moved rearwardly of the machine in the same general direction as the pads move when passing said magazines, and the passages 134 come into registration with the ports 135 before the forward ends of the pads meet the forward ends of the labels, as seen in Fig. 13. Taking up in detail the picking of the label as shown in Figs. 13, 14 and 15, Fig. 13 shows the forward end of the pad in the act of contacting with the foremost label of the magazine adjacent to the finger 123, with the forward end of the label projecting slightly beyond the forward end of the pad. When the pad and label thus meet, the pad and magazine are moving at the same speed, so as to travel together at the moment when the port 133 of the pad is closed by the label, thereby causing the label to adhere to the pad by the air suction or partial vacuum created. Ordinarily, the foremost label is advanced in the magazine against the finger 123 slightly beyond a line tangent to the curved face of the pad 132 when it is in label-receiving position, so that the pad in contacting with and rolling against the labels in the magazine, will push the labels outwardly slightly, and the finger 123 will follow them, as seen in Fig. 14. At this moment, when the pad and foremost label have met, the magazine is given a slightly faster movement than the pad, due to the formation of the cam groove 149, so that the forward end portion of the foremost label adhering to the pad 132 will be drawn from behind the finger 123, as seen in Fig. 14, thereby removing the forward end of the foremost label from said retaining finger. This removal of the forward end of the label is facilitated owing to the pushing of the labels outwardly in the magazine by the pad as they come into contact, thereby moving the forward ends of the labels away from the finger 123, which, however, by the tension of the spring 214, will swing away from the wheel 106. This slight release of pressure against the finger 123 will facilitate the withdrawal of the forward end of the foremost label from said finger, and due to the fact that the magazine has moved slightly faster than the pad 132, the forward end of the label is not only withdrawn from the finger 123, but, furthermore, the rear end of the label being moved with the magazine will cause the label to buckle or bow away from the other labels toward the wheel 106, as seen in Fig. 14, thereby facilitating the separation of the formost label from the second or succeeding one. Then, as the pad 132 continues its uniform movement, and the magazine completes its rearward movement, the forward end of the foremost label is carried away from the magazine on a curved line as seen in Fig. 15, and the finger 123 will serve to deflect the forward end of the label away from the magazine, thereby further facilitating the separation of the label being picked from the remaining ones in the magazine. Thus, after the forward end of the label has been withdrawn from the finger 123, and the label is moved with the pad 132, the forward end of the label in contacting with the finger 123 will be deflected away from the other labels rather than again passing behind the finger as before being removed. The magazine is then reversed and returned forwardly to initial position, thereby stripping the label from the magazine, it being noted that the rear ends of the labels are pushed inwardly against the retaining and separating pin 124 which resist the withdrawal of the rear end of the labels from the magazine. However, when a label adheres to the pad by air suction and friction, preventing the label from slipping with respect to the pad, the rear end of the label is pulled away from the side member 110′ of the magazine, as seen in Fig. 15, and, owing to the oblique position of the pin 124, the label in being pulled, instead of immediately tearing loose from the pin, will slide laterally and forwardly on the pin while moving longitudinally. Thus, referring to Fig. 15, the label which is being pulled from the magazine by the pad 132 is shown with its rear end portion sliding on the pin 124, thereby causing the label to shift longitudinally with respect to the next label, and also shifting the label parallel with itself or laterally away from the succeeding one, to assure of the proper separation of the labels and to prevent more than one being torn loose. The pin 124 is tapered to a pointed end which engages the labels, so that as the label is pulled on the pin, the hole is enlarged and the label is then torn loose easily from the pin, leaving a minute or practically unnoticeable tear. The feature of causing the rear end of the label to slide on the pin in an oblique line is of considerable advantage, because the label is thus compelled to move longitudinally with respect to the next label, and at the same time, to shift away from such second label, to prevent the labels from sticking together, and thereby assuring of only the first label being pulled loose at its rear end from the magazine. The label is thus effectively transferred from the magazine to the wheel 106, and is carried with the pad 132 to label-applying position, and as the pad 132 moves away from the magazine, the labels therein are again shifted inwardly by the follower arm 117 against the finger 123, and the magazine is returned to initial forward position as seen in Fig. 1.

When the port 133 is brought against the label, as above described, said port is closed, which shuts off the entrance of air into the passage 134 and tube 161, which would ordinarily result in the diaphragm 155 being moved, as seen in Fig. 3, to shift the slide 125 and wheel 106 inwardly. However, when the label pad 132 is in label receiving position, the plate 191 is in contact with the plate 193 as seen in Fig. 13, thereby restraining the inward movement of the slide and wheel and retaining said wheel in proper position, with the pad 132 pushing the labels back in the magazine slightly, and after the forward terminal of the label is taken from the magazine and pulled therefrom, the plate 191 in moving away from the plate 193 releases the wheel 106, so that the air suction against the diaphragm 155 will result in the lever 157 being swung to shift the slide 125 and wheel 106 inwardly to label-applying position at the time that the label is being carried by the pad 132 from the magazine to the bottle. The plates 191 and 193 thus prevent the premature shifting of the wheel 106 to label-applying position until the label has been properly taken from the magazine. Ordinarily, when air is admitted through the port 133 in the absence of the label, the resistance offered by the spring 141 is sufficient to prevent the air suction from moving the diaphragm 155 and lever 157, so that the slide 125 and wheel 106 remain in label-receiving position. However, when air is not admitted to the casing 154, the air suction overcomes the spring 141 and shifts the slide 125 inwardly to bring the wheel 106 to, label-applying position. As the bottle moves between the label-applying wheels 106, the pads 132 approach the bottle and the labels carried by the pads are therefore laid in fixed relation against the pasted areas of the bottles or in the depressions thereof, with which the arcuate pads move with a rolling motion. When the forward ends of the labels have been brought against the pasted sides of the bottle, so as to stick thereto, the passages 134 reach the ends of the ports 135 and the air suction is cut off, thereby releasing the labels from the pads. The pads 132 press the labels against the bottle over the areas which were covered by paste by the paste applying devices, and the valve 130 now cutting off the air will retain the wheels 106 in applying position, to press the labels against the bottle. As the bottle leaves the label applying devices, the pads are again moved to label receiving position, to repeat the operation for the next bottle, the air passages being again opened so that the springs 141 act to return the slides 125 and wheels 106 toward the magazines. It will be apparent that when the air suction is shut off, after the labels are started into contact with the bottle, the partial vacuum in the casings 154 is maintained, owing to the valves 130 closing the air inlet passages 134, until the rear ends of the pads 132 leave the bottle after properly applying the labels. At this time, the passages 134 in reaching the ports 135 again will establish the flow of air, thereby relieving the vacuum in the casings 154, so that the springs 141 again assert themselves and move the slides 125 and wheels 106 toward the label magazines to pick up the next labels and repeat the operation as above described.

A safety feature resides in the movement of the wheels 106 automatically into and out of label applying position. Should either of the wheels 106 refuse to pick up the label from the magazine, the port 133 remains open, and the spring 141 will therefore hold the slide 125 and wheel 106 out of applying position, and in this position of the wheel 106, as seen in full lines in Fig. 16, the nipple 184 moves on a line beyond the outer edge of the valve strip 185, so that when the passage 134 is closed, the passage 183 is opened, thereby continuing to admit air, although the passage 134 is closed, which would ordinarily enable the contrivance 153 to shift the slide 125 and wheel 106 to label applying position. Thus, during the movement of the pad 132 from the magazine to the bottle, air can flow through the passage 134 into the casing 154, to prevent the movement of the wheel 106 inwardly to applying position, and when the valve 130 closes the passage 134, air can enter through the passage 183, which remains open, due to the fact that the nipple 184 is not closed by the strip 185. However, when a label is taken by the pad, the nipple 184 in being shifted inwardly with the wheel 106 will move under the valve strip 185, to prevent the flow of air into the passage 183 when the label is being applied. Consequently, the secondary inlet means cooperates with the air inlet means leading from the port of the pad, to admit air when the valve closes the passage 134 after a label has been refused, but is inoperative when a label is taken by the pad. This, as above indicated, avoids the wheel 106 jumping to applying position when the pad 132 reaches the bottle and the passage 134 is closed by the valve 130. Therefore, when a label is refused, the wheel 106 remains in its outer label-receiving position, and this prevents the pad 132 from contacting with the paste on the bottle, which, if it occurred, would cause the label wheel to be gummed up, causing the labels to stick thereto and putting the machine out of commission until the wheel 106 and its pad 132 are cleaned.

The conveyor track can be raised and lowered by adjusting the rails 25 vertically, and when labels of different sizes are used, the magazine sides or members 110 and 110' can be adjusted for the length of the label. By adjusting the label magazines longitudinally on the slides 107, this will regulate the relative longitudinal positions so that the labels are carried by the pads 132 and applied to the bottles, and by raising and lowering the magazines on said slides, this will adjust the labels vertically and regulate the transverse positioning thereof on the bottles. It is thus an easy matter to make adjustments for the proper application of the labels to the bottles, inasmuch as the magazines can be adjusted longitudinally and vertically whereby the labels are transferred accordingly to the pads 132 and bottles.

*Label ironing and moistening devices.*

Two devices are employed (one of which is shown in detail in Fig. 24) for ironing out the labels on the bottles and supplying moisture for preventing the ironing members from being gummed up and to also cause the labels to lay flat against the bottles. These devices are disposed at the opposite sides of the conveyor track forwardly of the label-applying devices and are also carried by the labels 22 for adjustment therewith, the same as the paste and label applying devices. Each of the ironing and moisture supplying devices includes a wheel 166 rotatable in the horizontal plane of the wheels 84, 90 and 106 at one side of the conveyor track, and which wheel 166 is secured on the upper end of a vertical shaft 167 projecting through the top of a gear case 168 carried by the forward edge of the respective table 22, which can contain lubricant. A transverse actuating shaft 169 is journaled through the two gear cases 168 and has a sprocket wheel 170 secured thereon over which the sprocket chain 104 passes. A bevel gear 171 is feathered on the shaft 169 within each case 168 and meshes with a similar gear 172 secured to the lower end of the respective shaft 167 for driving the wheel 166.

An arcuate ironing member 173 is secured to the periphery of each wheel 166 and is adapted to have a rolling contact with the corresponding label on the bottle as it passes between the wheels 166, to thus iron out the label against the bottle. The gear cases 168 have upstanding bearings 181 in which the shafts 167 are journaled and extending to the hubs of the wheels 166, the upper ends of the bearings 181 being provided with annular pockets 182 obtaining absorbent fillings or packings for holding the lubricant to lubricate the parts.

Each ironing device also includes means for supplying moisture to the ironing member 173, including a moisture or water elevating disk 174 disposed in a vertical plane tangent to the circular line of movement of the member 173, so that said member in passing the disk rolls against the face thereof above the center of the disk. Said disk is mounted within a water receptacle 175 carried by an arm 176 embracing and secured to the bearing 181, as seen in Fig. 24, and the disk 174 is secured on a horizontal shaft 177 below the wheel 166. Said shaft is journaled within an adjustable bushing 178 having a knob 179 which can be rotated, whereby said bushing can be screw-threaded within the wall of the receptacle 175 to adjust the disk 174 for the proper contact of the bearing member 173 with the face of said disk. A leaf spring 180 secured to the receptacle 175 bears against the periphery of the knob 179, to hold the bushing in its adjustment and prevent accidental adjustment. Water is elevated by the disk 174, due to the rotation thereof by the contact of the member 173 with the disk in passing over the center thereof, and the face of the disk is thus kept moistened with a film of water, so that the face of the member 173 is moistened each time it passes the disk of the moisture supplying means. The results obtained are two fold, namely, any paste which is taken up by the member 173 from the side of a bottle against which a label was not applied, will be diluted and washed from said member by the water, to prevent the ironing member from being gummed up and the labels of subsequent bottles adhering thereto. This keeps the ironing member clean and moist, even though labels are refused occasionally, and which would naturally permit the ironing members to contact with the paste on the bottles; and, secondly, the ironing members being moistened will moisten the outer surfaces of the labels as the ironing members roll against the labels to iron them out against the bottles. It is well known, that paper, when moistened, such as by the paste one one side, will have a tendency to curl or warp in one direction or other, depending upon the grain of the paper, and with the present machine, the labels in being moistened by the paste on the inner surfaces thereof will have a tendency to curl or bend, and loosen themselves from the bottles. However, the ironing members in moistening the outer sides of the labels, will result in both the inner and outer sides being moistened, thereby preventing the curling of the labels and causing them to lay flat against the bottles and to dry and set uniformly.

*Summary.*

From the foregoing, taken in connection with the drawings, the operation of the machine will no doubt be fully understood, it being noted that the bottles are taken one at a time from the bottle magazine and moved longitudinally in the conveyor track with the chain 32, passing in succession between the paste applying devices, label applying devices and ironing and moisture supplying devices. The bottles are delivered from the forward end of the conveyor track through a delivery channel 300 having its bottom open for the passage of the chain 32, and corresponding sprocket wheel 33. The adjustment of the labels 22 transversely by the screw 24 will either widen or reduce the width of the conveyor track for different sizes of bottles, and such adjustment will automatically adjust the paste and label applying devices and ironing and moisture supplying devices, simultaneously. By adjusting the rails 25 upwardly and downwardly, the upper run of the conveyor chain 32 can be raised or lowered, for different sizes of bottles and the positioning of the labels longitudinally and transversely or vertically with respect to the bottles is regulated accurately by the adjustment of the label magazines longitudinally and vertically.

Although with the present machine, the labels can be applied to opposite sides of the bottles, the devices at one side can be rendered inoperative or eliminated when the labels are to be applied to one side only, and the parts cooperating with the bottles can also be readily altered or interchanged to readily accommodate bottles whose sides are flat or curved.

The operation is continuous in that the bottles are continually moved in the conveyor track and operated on in succession by the devices which they pass. The machine therefore provides for the economical and efficient labeling of the bottles.

Having thus described the invention, what is claimed as new is:—

1. In a machine of the character described, a magazine for objects having a longitudinal opening, conveying means working past one end of the magazine, a frame, supporting rods carried by the frame below the magazine parallel therewith, an endless belt having its upper run working within said opening for advancing the objects to the conveying means, pulley wheels around which said belt passes, label applying means cooperable with the objects conveyed, and brackets supporting said magazine and pulley wheels mounted adjustably on said rods.

2. In a machine of the character described, a magazine for objects, conveying means working past one end of said magazine for conveying the objects therefrom, a guide for the conveying means extending away from said magazine and having opposite sides between which the conveying means moves, and a spring buffer having one end secured in substantially the plane of that side of the guide opposite to the magazine, the buffer extending across said end of the magazine in a direction opposite to that in which the objects are moved by the conveying means, and said buffer being adapted to spring away from the magazine and to guide the objects into said guide when moved from the magazine by the conveying means.

3. In a machine of the character described, a magazine for objects, conveying means working past one end of said magazine for conveying the objects forwardly therefrom, a guide for said conveying means extending away from the magazine and having opposite side flanges, and a leaf spring buffer disposed across said end of the magazine and having its forward end secured in place substantially in the plane of the side flange of the guide opposite to the magazine, said buffer projecting rearwardly and having its rear end free to flex away from the magazine by the contact of the objects therewith when moved from the magazine onto the conveying means, and said buffer guiding the objects into said guide when moved away from the magazine by the conveying means.

4. In a machine of the character described, a magazine for objects, conveying means working past one end of said magazine for conveying the objects therefrom, said magazine being such as to move the objects therefrom to the conveying means, a block supported at that side of the conveying means opposite to said end of the magazine, label applying means cooperable with the objects conveyed, and a leaf spring buffer having its forward end secured to said block, and its rear end free to flex away from the magazine by the contact of the rear ends of the objects therewith, said block having a recess into which said buffer can flex.

5. In a machine of the character described, a magazine for objects, conveying means working across one end of the magazine to receive the objects transversely thereon, said magazine being arranged at an angle with the conveying means, means operated when one object is being moved by the conveying means away from the magazine for detaining the next object in the magazine while said two objects have a relatively sliding movement, and label applying means cooperable with the objects conveyed.

6. In a machine of the character described, a magazine for objects, conveying means working past one end of said magazine for conveying objects therefrom to be operated on, label applying means cooperable with the objects conveyed, and automatic means operated by the movement of one object with the conveying means from the magazine for detaining the remaining objects in the magazine until said object has been moved therefrom.

7. In a machine of the character described, a magazine for objects, conveying means working past one end of the magazine for conveying objects therefrom to be operated on, label applying means cooperable with the objects conveyed, and automatic means operated by the movement of one bottle with the conveying means from the magazine for detaining the succeeding objects in the magazine during the movement of the first named object therefrom.

8. In a machine of the character described, a magazine for objects, conveying means working past said magazine for conveying the objects therefrom to be operated on, a member arranged to be moved by an object conveyed by said conveying means from the magazine, label applying means cooperable with the objects conveyed, and a detent operated by said member for holding the succeeding object in the magazine.

9. In a machine of the character described, a magazine for objects, conveying means working past said magazine for conveying the objects therefrom to be operated on, a rock shaft, an arm secured to said shaft, and arranged to be swung by an object moving with the conveying means from the magazine, label applying means cooperable with the objects conveyed, and a second arm secured to said shaft having a detent for holding the succeeding object in the magazine when the first named arm is swung.

10. In a machine of the character described, a magazine for objects, conveying means working past said magazine for conveying objects therefrom to be operated on, a plate over the delivery portion of the magazine under which the objects move to the conveying means, label applying means cooperable with the objects conveyed, and means mounted on said plate to be operated by an object moved with the conveying means from the magazine for detaining the next object in the magazine during the removal of the first named object therefrom.

11. In a machine of the character described, a magazine for objects, conveying means working past one end of said magazine for conveying the objects therefrom to be operated on, a plate mounted over said end portion of the magazine under which the objects move to the conveying means, a rock shaft carried by said plate longitudinally of the magazine, an arm secured to said shaft and projecting in the path of the object moved by the conveying means from the magazine so as to swing said arm, a second arm carried by said shaft and adjustable longitudinally thereon, a detent carried by the second arm to contact with the next object in the magazine for holding it when the first named arm is swung, label applying means cooperable with the objects conveyed, and means for yieldingly holding said shaft with the detent in releasing position and the first named arm in its aforesaid position.

12. In a machine of the character described, a frame, a conveyor track, means supporting said track from the frame for vertical adjustment, an endless conveyor member working in said track for conveying objects therein to be operated on, wheels beyond the ends of said track supporting said conveyor member, means supporting said wheels from the frame for vertical adjustment, and label applying means cooperable with the objects conveyed in said track.

13. In a machine of the character described, a pair of rails adjustable relatively to one another for objects of different sizes, and having guide flanges for the objects, a channel supported between and from said rails below said flanges, an endless conveyor member working in said channel for conveying objects therewith to be operated on, and label applying means cooperable with the objects conveyed.

14. In a machine of the character described, a pair of parallel rails supported for adjustment toward and away from one another for objects of different widths, and having upper flanges for the objects, pins below said flanges and each secured in one rail and slidable in the other, a channel supported by said pins between the rails under said flanges, an endless conveyor member working in said channel for conveying objects to be operated on, and label applying means cooperable with the objects conveyed.

15. In a machine of the character described, a pair of members adjustable toward and away from one another, posts mounted on said members, rails for guiding objects, conveying means working between said rails for conveying objects to be operated on, clamping elements engaging the rails for clamping them to the posts, adjustable means carried by the posts for supporting said elements, and label applying means cooperable with the objects conveyed.

16. In a machine of the character described, label applying means, a paste transferring wheel for transferring paste to paste the labels to the objects, means for supplying paste to the periphery thereof, a scraper mounted for rocking movement beyond the periphery of said wheel and having one edge presented to the periphery of the wheel to scrape the paste therefrom, and means for adjusting said scraper to bring said edge closer to or farther away from said wheel.

17. In a machine of the character described, label applying means, a paste transferring wheel for transferring paste to paste the labels to the objects, means for supplying paste to the periphery thereof, a supporting bracket, a spindle mounted for rocking movement in the bracket, a scraper secured to the spindle and having one edge presented to the periphery of the wheel for scraping paste therefrom, and adjusting screws between said scraper and bracket located at opposite sides of said spindle.

18. In a machine of the character described, label applying means, a paste transferring wheel rotatable about a vertical axis for transferring paste to paste the labels to the objects, means for supplying paste to the periphery thereof, and a scraper having one edge presented to the periphery of said wheel for scraping paste therefrom, and said scraper having a lug extending under the lower edge of the periphery of said wheel for removing paste from below said edge.

19. In a machine of the character described, label applying means, a paste transferring wheel for transferring paste to paste the labels to the objects, means for supplying paste to the periphery thereof, a paste applying wheel having an arcuate pad to contact with the periphery of the paste transferring wheel, and scrapers mounted at opposite sides of the paste transferring wheel between the paste supplying means and paste applying wheel and individually adjustable, one to remove the surplus paste from the paste transferring wheel before the contact of said pad therewith, and the other to remove the paste from the paste transferring wheel after the contact of the pad therewith and before again receiving paste.

20. In a machine of the character described, means for pasting labels to objects, rotary ironing means having an arcuate outstanding pad to iron or flatten out the labels against the objects with a rolling motion against the objects, and means for supplying moisture to said pad for dissolving paste therefrom and to also moisten the outer surfaces of the labels so that they lay flat against the objects.

21. In a machine of the character described, means for pasting labels to objects, a rotatable ironing wheel having an arcuate outstanding ironing member to contact with the labels and flatten them out against the objects, and means for supplying moisture to said ironing member.

22. In a machine of the character described, a rotatable ironing wheel having an arcuate outstanding ironing member for flattening out labels pasted to passing objects, a water receptacle, and a water elevating disk working in said receptacle and arranged for the contact of said member with the face thereof.

23. In a machine of the character described, an ironing wheel having an arcuate ironing member to contact with labels pasted to passing objects for flattening out said labels, a water receptacle, a water elevating disk working in said receptacle and arranged for the contact of said ironing member with the face thereof, and means adjustably supporting said disk for adjustment toward and away from the ironing wheel to regulate the contact of said ironing member and disk with one another.

24. In a machine of the character described, a post having an air suction passage extending to the end thereof, a cup-shaped valve fitted over said post with an air space between said valve and end of the post, said valve having an arcuate port communicating with said space and passage, a label wheel having a hub rotatable on said valve and an air suction passage for picking a label from a magazine and carrying it to an object, said passage of the label wheel registering with said port during the movement of said passage from the magazine to label-applying position, and means for clamping said valve on the post in its angular position and holding the wheel on the valve.

25. In a machine of the character described, a slide, label applying means carried by the slide to move to and from label-applying position, a shaft carried by the slide for operating said means, a driving member in alinement with said shaft, and a sliding connection between said member and shaft.

26. In a machine of the character described, a slide, label applying means carried by the slide for movement to and from label-applying positions, and operating mechanism for said means including a pair of alining shafts, one shaft being movable longitudinally with said slide and connected to said means, a sleeve carried by one shaft having a featherway, and a roller carried by the other shaft and working in said featherway.

27. In a machine of the character described, label-applying means having an air suction port for picking a label from a magazine and carrying it to a point for application to an object, said means being mounted for shifting movement to and from label-applying position, an air suction conduit communicating with said port, a valve for closing said conduit when said port reaches applying position, air inlet means controlled by said valve for admitting air to said conduit when the entrance of air from said port is cut off by said valve, means for closing said air inlet means when the label applying means is shifted to applying position, and means controlled by the air suction in said conduit for shifting said label applying means.

28. In a machine of the character described, a rotatable wheel having an air suction port for picking a label from the magazine and carrying it to a point for application to an object means mounting said wheel for shifting movement to and from applying position, an air suction conduit communicating with said port, a valve for closing communication between said port and conduit when the port reaches applying position, means controlled by air suction in said conduit for shifting said wheel, said wheel having an air inlet passage controlled by said valve to communicate with said conduit when the valve cuts off communication between said port and conduit, and means for closing said air inlet passage of said wheel when the wheel is shifted to applying position.

29. In a machine of the character described, a slide, label-applying means carried by the slide and having an air suction port for picking a label from a magazine and carrying it to a point for application to an object, said means having an air inlet passage, an air suction conduit to communicate with said port and passage, a valve controlling such communication whereby said port and passage alternately communicate with said conduit and arranged for cutting off communication between said port and conduit when the port reaches applying position and until it moves to label-receiving position, means controlled by air suction in said conduit for shifting said slide, and means for closing said air inlet passage when the slide is shifted to label-applying position with said passage in communication with said conduit.

30. In a machine of the character described, a slide, a label wheel carried thereby and having an air suction port for picking a label from a magazine and carrying it to a point for application to an object, said wheel having an air inlet passage, an air suction conduit to communicate with said port and said passage, a valve controlling such communication for alternate communication of said port and passage with said conduit and for cutting off communication of the port with said conduit when the port reaches applying position and during its movement to label-receiving position, means controlled by air suction in said conduit for shifting said slide to and from label-applying position, and means for closing said passage when said wheel is shifted to label-applying position with the slide and and during communication of said passage with said conduit.

31. In a machine of the character described, a slide, a label wheel carried thereby and having an air suction port for picking a label from a magazine and carrying it to a point for application to an object, said wheel having an air inlet passage, an air suction conduit to communicate with said port and said passage, a valve controlling such communication for alternate communication of said port and passage with said conduit and for cutting off communication of the port with said conduit when the port reaches applying position and during its movement to label-receiving position, means controlled by air suction in said conduit for shifting said slide to and from label-applying position, and an arcuate valve strip arranged for the movement of the entrance of said passage therealong to close said passage when the wheel is shifted to label applying position with the slide, during the communication of said passage with said conduit.

32. In a machine of the character described, a slide, a rotatable wheel carried by the slide having an air suction port for picking a label from a magazine and carrying it to a point for application to an object, said wheel having an air inlet passage with a nipple at the inlet end thereof, an air suction conduit to communicate with said port and passage, a valve controlling such communication for the alternate communication of said port and passage with said conduit and for cutting off communication of said port with the conduit when the port reaches label applying position and during its movement to label-receiving position, means controlled by the air suction in said conduit for shifting the slide to and from label applying position, a resilient plate, and an arcuate valve strip supported by said plate and arranged for the movement of said nipple along said strip when the wheel is shifted to label applying position with said slide, so as to close said passage while in communication with said conduit in such position of said wheel.

33. In a machine of the character described, label applying means having an air suction port for picking a label and carrying it to a point for application to an object, said means mounted for shifting movement to and from applying position, an air suction conduit to communicate with said port, means for controlling such communication, means controlled by air suction in said conduit for shifting the label applying means to and from applying position, a label magazine movable a short distance with said port for the picking of a label from the magazine, and means for preventing the label applying means from shifting to applying position until the label is properly picked from the magazine.

34. In a machine of the character described, a slide, a rotatable wheel carried thereby having an air suction port for picking a label and carrying it to a point for application to an object, an air suction conduit to communicate with said port, means for controlling such communication, means controlled by air suction in said conduit for shifting said slide to and from label applying position, a label magazine movable a short distance with said port for the picking of a label from the magazine, a member carried by said wheel, and another member past which said member is movable during the picking of a label from the magazine for preventing said wheel and slide shifting to applying position until the label has been picked.

35. In a machine of the character described, a slide, a label magazine carried by the slide adjustable for labels of different lengths, a label wheel having means movable past said magazine for picking labels therefrom, a lever, means for operating said lever, and a connection between said lever and slide adjustable toward and away from the fulcrum of said lever for regulating the amount of movement of the slide according to the length of the labels in the magazine.

36. In a machine of the character described, a slide, a label magazine carried by the slide and adjustable for labels of different lengths, a label wheel having means movable past said magazine for picking labels therefrom, a lever, a link connected to said slide, a pivot between said lever and link, and means for adjusting said pivot toward and away from the fulcrum of the lever to regulate the movement of the slide according to the length of the labels in the magazine, and a cam for swinging said lever to move the magazine with and relatively to said picking means for the transfer of the label from the magazine to said wheel.

37. In a labeling machine of the character described, a label applying wheel having a label pad with an air suction port near the forward end thereof, a movable label magazine having a retaining finger for the forward ends of the labels, an air suction conduit communicating with said port, and means for rotating said wheel and reciprocating the magazine whereby said pad and magazine move at substantially the same speed in the same direction when they meet, and the magazine then moves at a greater speed than the pad for withdrawing the forward end of the first label from behind said finger and buckling said label to separate it from the second label.

38. In a labeling machine of the character described, a rotatable label applying wheel having a label pad with an air suction port near the forward end thereof, a slidable label magazine, said pad when contacting with the labels in the magazine pushing the labels back in said magazine, a retaining finger for the forward ends of the labels spring-actuated to follow the labels backwardly, an air suction conduit communicating with said port, and means for actuating said wheel and magazine for moving them at substantially the same speed in the same direction when they meet and for moving the magazine faster than the pad when the labels are pushed back by the pad, so as to withdraw the forward end of the first label from behind said finger.

39. In a labeling machine of the character described, a label applying wheel having a label pad and an air suction port near the forward end thereof, a slidable label magazine past which said pad is movable, a pivoted retaining finger carried by the magazine and overlapping the forward end of the first label, said pad being arranged to push the labels back in the magazine, spring means for swinging said finger to move back with the labels, an air suction conduit communicating with said port, and actuating means for said wheel and magazine to move said pad and magazine at substantially the same speed when they meet and to then move the magazine faster than the pad when the labels are pushed back, to withdraw the forward end of the first label from behind said finger.

40. In a labeling machine of the character described, a label applying wheel having a label pad with an air suction port near the forward end thereof, a slidable label magazine, an adjustable member carried by the magazine, a movable retaining finger carried by said member and projecting therefrom to overlap the forward end of the first label in the magazine, said pad pushing the labels back in the magazine, spring means between said finger and member for moving said finger back with the labels, an air suction conduit communicating with said port, and means for actuating said wheel and magazine for moving said pad and magazine at substantially the same speed when they meet and to then move the magazine faster than the pad to withdraw the forward end of the first label from behind said finger when the labels are pushed back in the magazine by the pad.

41. In a labeling machine of the character described, a label magazine, means for picking the labels therefrom and pulling them longitudinally from the magazine and applying the labels to objects, a tubular stem carried by the magazine having one terminal projecting to overlap the rear end of the first label, a rod in said stem, said stem and rod having apertures therein, an oblique pin in said apertures having a pointed terminal presented to the rear end portions of the labels, whereby the rear end of the first label when pulled from the magazine slides on the pin before tearing loose, means for moving said rod in the stem to clamp the pin, and means for the adjustment of said stem.

42. In a labeling machine of the character described, a label magazine embodying a bottom plate, side members thereon, one of which is slidable transversely of itself on the plate for adjusting the magazine for labels of different lengths, parallel rods supported above said plate and slidably engaging said side member, means between said side member and rods for the adjustment of said side member toward and away from the other one, and means operable for picking the labels from the magazine and applying them to objects.

43. In a labeling machine of the character described, a label magazine, means for advancing the labels in the magazine, an arm overhanging the magazine and having a head to bear on the edges of the labels for holding them down and guiding them in the magazine to the delivery portion thereof, and means operable for picking the labels from the magazine and applying them to objects.

44. In a labeling machine of the character described, a label magazine having side members for holding the labels between them, an arm overhanging the magazine having a head to bear on the edges of the labels for holding them down in the magazine, said head having a deflecting portion for moving the labels into place as they are advanced to the delivery portion of the magazine, means for advancing the labels in the magazine, means for pivoting and clamping said arm to one of said side members to bring said head into place against the labels and retain it in such position, and means operable for picking the labels from the magazine and applying them to objects.

45. In a labeling machine of the character described, a label magazine, retaining means for the forward label in the magazine, and a finger supported above the magazine at the delivery portion thereof for the contact of the upper edges of the labels to prevent them falling out of the magazine, and means operable for picking the labels from the magazine and applying them to objects.

46. In a labeling machine of the character described, a label magazine, retaining means for the forward label in the magazine, a rod extending over the delivery portion of the magazine, a block adjustable on said rod, an adjustable finger carried by said block to project downwardly in front of the upper edges of the labels to prevent them from tilting and falling out of the magazine, and means operable for picking the labels from the magazine and applying them to objects.

47. In a labeling machine of the character described, a label magazine having bottom plate and side members secured thereon, retaining means for the forward label carried by said side members, a wire clamped on the bottom plate under one of said side members below the retaining means for limiting the movement of the lower edges of the labels under said retaining means, and means operable for picking the labels from the magazine and applying them to objects.

48. In a labeling machine of the character described, a label magazine, a follower plate movable in the magazine for advancing the labels therein, a follower arm mounted for swinging movement and having its free end bearing against said follower plate, spring means for swinging said arm to advance said follower plate, and means operable for picking the labels from the magazine and applying them to objects.

49. In a machine of the character described, label-applying means having an air suction port for picking up a label from a magazine and carrying it to a point for application to an object, said means being mounted for shifting movement to and from label-applying position, an air suction conduit communicating with said port, means controlled by the air suction in said conduit for shifting said label-applying means, means for shutting off the air suction from said port when said port reaches applying position, and means constructed and arranged for admitting air to said conduit when said port reaches a position corresponding with label-applying position when the label-applying means has not been shifted to applying position, thereby permitting the continued admission of air to the conduit when a label is missed and the port remains open while moving toward applying position.

In testimony whereof I hereunto affix my signature.

FREDERICK L. SHELOR.